United States Patent
Gupta et al.

(10) Patent No.: US 10,698,881 B2
(45) Date of Patent: Jun. 30, 2020

(54) DATABASE SYSTEM WITH DATABASE ENGINE AND SEPARATE DISTRIBUTED STORAGE SERVICE

(71) Applicant: Amazon Technologies, Inc., Seattle, WA (US)

(72) Inventors: Anurag Windlass Gupta, Atherton, CA (US); Neal Fachan, Seattle, WA (US); Samuel James McKelvie, Seattle, WA (US); Laurion Darrell Burchall, Seattle, WA (US); Christopher Richard Newcombe, Kirkland, WA (US); Pradeep Jnana Madhavarapu, Mountain View, CA (US); Benjamin Tobler, Seattle, WA (US); James McClellan Corey, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 3 days.

(21) Appl. No.: 15/369,681

(22) Filed: Dec. 5, 2016

(65) Prior Publication Data

US 2017/0083565 A1  Mar. 23, 2017

Related U.S. Application Data

(62) Division of application No. 14/201,493, filed on Mar. 7, 2014, now Pat. No. 9,514,007.

(Continued)

(51) Int. Cl.
*G06F 16/23* (2019.01)
*G06F 11/14* (2006.01)
*G06F 11/20* (2006.01)

(52) U.S. Cl.
CPC ...... *G06F 16/2365* (2019.01); *G06F 11/1451* (2013.01); *G06F 11/1471* (2013.01);
(Continued)

(58) Field of Classification Search
CPC ..................................................... G06F 17/30
(Continued)

(56) References Cited

U.S. PATENT DOCUMENTS 5,280,612 A   1/1994  Lorie et al.
5,452,445 A   9/1995  Hallmark et al.
(Continued)

FOREIGN PATENT DOCUMENTS

CA   2783370    7/2011
EP   0675451    10/1995
(Continued)

OTHER PUBLICATIONS

Jim Gray, et al., "Transaction Processing: Concepts and Techniques—Chapter 10", In: "The Morgan Kaufmann Series in data management systems", Jan. 1, 1993, pp. 529-582.

(Continued)

*Primary Examiner* — Kim T Nguyen
(74) *Attorney, Agent, or Firm* — Robert C. Kowert; Kowert, Hood, Munyon, Rankin & Goetzel, P.C.

(57) ABSTRACT

A database system may include a database service and a separate distributed storage service. The database service (or a database engine head node thereof) may be responsible for query parsing, optimization, and execution, transactionality, and consistency, while the storage service may be responsible for generating data pages from redo log records and for durability of those data pages. For example, in response to a write request directed to a particular data page, the database engine head node may generate a redo log record and send it, but not the data page, to a storage service node. The storage service node may store the redo log record and return a write acknowledgement to the database service prior to applying the redo log record. The server node may apply (Continued)

the redo log record and other redo log records to a previously stored version of the data page to create a current version.

20 Claims, 14 Drawing Sheets

Related U.S. Application Data

(60) Provisional application No. 61/794,572, filed on Mar. 15, 2013.

(52) U.S. Cl.
CPC .......... *G06F 16/23* (2019.01); *G06F 11/2094* (2013.01); *G06F 2201/80* (2013.01)

(58) Field of Classification Search
USPC ...................................................... 707/683
See application file for complete search history.

(56) References Cited

U.S. PATENT DOCUMENTS

| | | | |
|---|---|---|---|
| 5,471,614 A | 11/1995 | Kakimoto | |
| 5,524,205 A | 6/1996 | Lomet et al. | |
| 5,530,850 A | 6/1996 | Ford et al. | |
| 5,870,758 A | 2/1999 | Bamford et al. | |
| 5,907,848 A | 5/1999 | Zaiken et al. | |
| 5,951,695 A | 9/1999 | Kolovson | |
| 6,041,423 A | 3/2000 | Tsukerman | |
| 6,233,585 B1 | 5/2001 | Gupta et al. | |
| 6,240,413 B1 | 5/2001 | Learmont | |
| 6,615,219 B1 | 9/2003 | Bruso et al. | |
| 6,631,374 B1 | 10/2003 | Klein et al. | |
| 6,732,124 B1 | 5/2004 | Koseki et al. | |
| 6,732,171 B2 | 5/2004 | Hayden | |
| 6,792,518 B2 | 9/2004 | Armangau et al. | |
| 6,832,229 B2 | 12/2004 | Reed | |
| 6,976,022 B2 | 12/2005 | Vemuri et al. | |
| 7,010,645 B2 | 3/2006 | Hetzler et al. | |
| 7,089,253 B2 | 8/2006 | Hinshaw et al. | |
| 7,146,386 B2 | 12/2006 | Xiao | |
| 7,287,034 B2* | 10/2007 | Wong | G06F 16/273 |
| 7,305,386 B2 | 12/2007 | Hinshaw et al. | |
| 7,308,456 B2 | 12/2007 | Friske et al. | |
| 7,328,226 B1 | 2/2008 | Karr et al. | |
| 7,403,945 B2* | 7/2008 | Lin | G06F 16/2343 |
| 7,716,645 B2 | 5/2010 | Dolby et al. | |
| 7,747,663 B2 | 6/2010 | Atkin et al. | |
| 7,885,922 B2 | 2/2011 | Pareek et al. | |
| 7,930,271 B2 | 4/2011 | Tarbell | |
| 7,937,551 B2 | 5/2011 | Schott | |
| 7,979,670 B2 | 7/2011 | Saliba et al. | |
| 8,086,650 B1 | 12/2011 | Milford | |
| 8,156,083 B2* | 4/2012 | Banerjee | G06F 16/217 |
| | | | 707/684 |
| 8,209,515 B2 | 6/2012 | Schott | |
| 8,255,627 B2 | 8/2012 | Blinick et al. | |
| 8,266,114 B2 | 9/2012 | Mace et al. | |
| 8,271,830 B2 | 9/2012 | Erofeev | |
| 8,289,801 B2 | 10/2012 | Smith et al. | |
| 8,301,670 B2 | 10/2012 | Revah et al. | |
| 8,326,897 B2 | 12/2012 | Butterworth et al. | |
| 8,341,128 B1 | 12/2012 | Ruggiero | |
| 8,370,715 B2 | 2/2013 | Hafner et al. | |
| 8,380,670 B2 | 2/2013 | Kuber et al. | |
| 8,392,479 B1 | 3/2013 | Pantin | |
| 8,396,831 B2 | 3/2013 | Larson et al. | |
| 8,412,689 B2 | 4/2013 | Reid et al. | |
| 8,412,752 B2 | 4/2013 | Dodge | |
| 8,429,121 B2 | 4/2013 | Pareek et al. | |
| 8,463,825 B1 | 6/2013 | Harty et al. | |
| 8,527,462 B1* | 9/2013 | Talius | G06F 16/1734 |
| | | | 707/639 |
| 8,589,361 B2* | 11/2013 | Hu | G06F 12/0866 |
| | | | 707/692 |
| 9,047,189 B1 | 6/2015 | Gupta et al. | |
| 9,171,020 B2* | 10/2015 | Faerber | G06F 16/215 |
| 9,208,032 B1 | 12/2015 | McAlister et al. | |
| 9,223,843 B1 | 12/2015 | Madhavarapu et al. | |
| 9,229,983 B2* | 1/2016 | Yu | G06F 16/24524 |
| 9,280,591 B1 | 3/2016 | Kharatishvili et al. | |
| 9,298,564 B2* | 3/2016 | Lee | G06F 11/1471 |
| 9,304,998 B2* | 4/2016 | Diaconu | G06F 16/128 |
| 9,305,056 B1 | 4/2016 | Gupta et al. | |
| 9,317,213 B1 | 4/2016 | Gupta et al. | |
| 9,460,008 B1 | 10/2016 | Leshinsky et al. | |
| 9,465,693 B2 | 10/2016 | Gupta et al. | |
| 9,501,501 B2 | 11/2016 | Madhavarapu et al. | |
| 9,507,843 B1 | 11/2016 | Madhavarapu et al. | |
| 9,514,007 B2 | 12/2016 | Gupta et al. | |
| 2002/0107835 A1 | 8/2002 | Coram et al. | |
| 2002/0143733 A1 | 10/2002 | Mukkamalla et al. | |
| 2004/0133622 A1 | 7/2004 | Clubb et al. | |
| 2004/0225696 A1 | 11/2004 | Wong et al. | |
| 2004/0249869 A1 | 12/2004 | Oksanen | |
| 2005/0015416 A1 | 1/2005 | Yamagami | |
| 2006/0020634 A1 | 1/2006 | Huras et al. | |
| 2006/0047626 A1 | 3/2006 | Raheem | |
| 2006/0224636 A1 | 10/2006 | Kathuria et al. | |
| 2008/0010322 A1 | 1/2008 | Lee et al. | |
| 2008/0183973 A1 | 7/2008 | Aguilera et al. | |
| 2008/0294648 A1 | 11/2008 | Lin et al. | |
| 2009/0177671 A1 | 7/2009 | Pellegrini et al. | |
| 2009/0192979 A1 | 7/2009 | Lunde | |
| 2009/0228511 A1 | 9/2009 | Atkin et al. | |
| 2009/0249001 A1 | 10/2009 | Narayanan et al. | |
| 2010/0036861 A1 | 2/2010 | Srihari et al. | |
| 2010/0050172 A1 | 2/2010 | Ferris | |
| 2010/0192131 A1 | 7/2010 | Dolby et al. | |
| 2010/0274750 A1 | 10/2010 | Oltean et al. | |
| 2011/0035548 A1 | 2/2011 | Kimmel et al. | |
| 2011/0060724 A1 | 3/2011 | Chan | |
| 2011/0072217 A1 | 3/2011 | Hoang et al. | |
| 2011/0145201 A1* | 6/2011 | Holst | G06F 11/2064 |
| | | | 707/655 |
| 2011/0161496 A1 | 6/2011 | Nicklin | |
| 2011/0178984 A1 | 7/2011 | Talius et al. | |
| 2011/0251997 A1 | 10/2011 | Wang et al. | |
| 2012/0005196 A1 | 1/2012 | Horii | |
| 2012/0011106 A1 | 1/2012 | Reid et al. | |
| 2012/0041899 A1 | 2/2012 | Greene et al. | |
| 2012/0166390 A1 | 6/2012 | Merriman et al. | |
| 2012/0174112 A1 | 7/2012 | Vaidya et al. | |
| 2012/0191648 A1 | 7/2012 | Kuber et al. | |
| 2012/0259889 A1 | 10/2012 | Dinker et al. | |
| 2012/0297073 A1 | 11/2012 | Glover et al. | |
| 2012/0303576 A1* | 11/2012 | Calder | G06F 11/2076 |
| | | | 707/611 |
| 2012/0310985 A1 | 12/2012 | Gale et al. | |
| 2012/0310986 A1 | 12/2012 | Frantz et al. | |
| 2012/0310991 A1 | 12/2012 | Frantz et al. | |
| 2012/0323849 A1 | 12/2012 | Garin, Jr. et al. | |
| 2013/0036281 A1 | 2/2013 | Revah et al. | |
| 2013/0042056 A1 | 2/2013 | Shats et al. | |
| 2013/0042156 A1 | 2/2013 | Srinivasan et al. | |
| 2013/0080386 A1 | 3/2013 | Dwyer et al. | |
| 2013/0080388 A1 | 3/2013 | Dwyer et al. | |
| 2013/0086129 A1 | 4/2013 | Brown et al. | |
| 2015/0100542 A1 | 4/2015 | Li et al. | |
| 2015/0113009 A1 | 4/2015 | Zhou et al. | |
| 2015/0286701 A1 | 10/2015 | Wideman | |
| 2015/0347541 A1 | 12/2015 | Holmes et al. | |

FOREIGN PATENT DOCUMENTS

| | | |
|---|---|---|
| EP | 1630674 | 3/2006 |
| JP | H10-254748 | 9/1998 |
| JP | 2005050024 | 2/2005 |
| JP | 2005276094 | 10/2005 |
| JP | 2006263581 | 10/2006 |
| JP | 2007200182 | 8/2007 |
| JP | 2007206759 | 8/2007 |

(56) References Cited

FOREIGN PATENT DOCUMENTS

| | | |
|---|---|---|
| JP | 2007317017 | 12/2007 |
| JP | 2012014502 | 1/2012 |
| JP | 2012507072 | 3/2012 |

OTHER PUBLICATIONS

Jim Gray, et al., "Transaction Processing: Concepts and Techniques—Chapter 12", In: "The Morgan Kaufmann series in data management systems", Jan. 1, 1993, pp. 631-657.
Mokrane Bouzeghoub, et al., "A Framework for Analysis of Data Freshness", Information Quality in Information Systems, ACM, Jun. 18, 2004, pp. 59-67.
M. Tamer Ozsu, et al., "Princeiples of Distributed Database Systems—Chapter 13—Data Replication", In: Principles of Distributed Database Systems, Third Edition, Mar. 2, 2011, Springer, pp. 459-495.
Office Action from Japanese Application No. 2016-501278, dated Nov. 29, 2016 (English translation and Japanese version, Pages.
Hector Garcia-Molina, et al., "Database Systems—The Complete Book Second Edition—Chapter 18—Concurrency Control", In: "Database systems the complete book, Second Edition", Jun. 15, 2005, pp. 883-951.
Atul Adya, et al., "Efficient Optimistic Concurrency Control Using Loosely Synchronized Clocks", SIGMOD Record, ACM, vol. 24, No. 2, May 22, 1995, pp. 23-34.
Office Action from Japanese Application No. 2016-501278, dated Jun. 20, 2017, Amazon Technologies, Inc., pp. 1-8.
"Amazon Web Services Blog" Downloaded Apr. 30, 2013 from http://aws.typepad.com/aws/2010/10/amazon-rdsannouncing-read-replicas.html, Published Oct. 5, 2010 pp. 1-11.
"Bloom Filter" Downloaded from http://en.wikipedia.org/wiki/Bloom_filter on May 15, 2013, pp. 1-12.
John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.
Jim Czuprynski "Oracle Database 11g: SQL Query Result Set Caching" published Jul. 30, 2008, downloaded May 15, 2013 from http://www.databasejournal.com/features/oracle/article.php/3760761/Oracle-Database-11 g-SQL -Query-Result-Set-Caching.htm, pp. 1-7.
"Oracle Database JDBC Developer's Guide and Reference: Chapter 20 Statement and Result Set from Caching" http://docs.oracle.com/cd/B28359_01/java.1111b31224/stmtcach.htm via the Wayback Machine Nov. 27, 2011, pp. 1-8.
Adrian Billington "Query Result Cache in Oracle 11g" downloaded from http://web.archive.org/web/20080124161135/http://www.oracle-developer.net/display.php?id=503 via the Wayback Machine Jan. 4, 2008, pp. 1-20.
Julian Dontcheff "Bloom Filters for DBAs" published Aug. 28, 2012, downloaded from http://juliandontcheff.wordpress.com/2012/08/28/bloom-filters-for-dbas/ on May 14, 2013, pp. 1-4.
Julian Dyke "Result Cache Internals" Nov. 2007, pp. 1-38.
Michele Cyran et al "Oracle Database Concepts 10g Release 2 (10.2)" Oct. 2005, pp. 1-542.
Lance Ashdown et al "Oracle Database Concepts 11g Release 2 (11.2)" Sep. 2011, pp. 1-460.
"Isolation (database systems)" downloaded from http://en.wikipedia.org/wiki/Isolation_(database_systems) on May 15, 2013, pp. 1-7.
Latika C. Savade, et al., "A Technique to Search Log Records using System of Linear Equations", Software Engineering (CONSEG), 2012 CSI Sixth International Conference, IEEE, Sep. 5, 2012, pp. 1-4.
U.S. Appl. No. 14/201,493, filed Mar. 7, 2014, Anurag Windlass Gupta et al.
U.S. Appl. No. 14/201,505, filed Mar. 7, 2014, Anurag Windlass Gupta et al.
U.S. Appl. No. 14/201,509, filed Mar. 7, 2014, Pradeep Jnana Madhavarapu et al.
U.S. Appl. No. 14/201,512, filed Mar. 7, 2014, Anurag Windlass Gupta et al.
U.S. Appl. No. 14/201,517, filed Mar. 7, 2014, Anurag Windlass Gupta et al.
U.S. Appl. No. 13/873,467, filed Apr. 30, 2013, Anurag Windlass Gupta et al.
U.S. Appl. No. 15/090,549, filed Apr. 4, 2016, Anurag Windlass Gupta et al.
U.S. Appl. No. 13/893,004, filed May 13, 2013, Laurion Darrell Burchall et al.
U.S. Appl. No. 13/901,111, filed May 23, 2013, Anurag Windlass Gupta et al.
U.S. Appl. No. 14/961,775, filed Dec. 7, 2015, Grant Alexander MacDonald McAlister et al.
U.S. Appl. No. 15/289,907, filed Oct. 10, 2016, Anurag Windlass Gupta et al.
U.S. Appl. No. 14/032,721, filed Sep. 20, 2013, Tengiz Kharatishvili et al.
U.S. Appl. No. 14/036,783, filed Sep. 25, 2013, Anurag Windlass Gupta et al.
U.S. Appl. No. 14/036,792, filed Sep. 25, 2013, Samuel James McKelvie et al.
U.S. Appl. No. 14/981,540, filed Dec. 28, 2015, Pradeep Jnana Madhavarapu et al.
U.S. Appl. No. 15/284,414, filed Oct. 3, 2016, Yan Valerie Leshinsky et al.
U.S. Appl. No. 14/085,668, filed Nov. 20, 2013, Anurag Windlass Gupta et al.
U.S. Appl. No. 14/032,681, filed Sep. 20, 2013, Samuel James McKelvie et al.
Extended European Search Report from PCT/US2014/023542, dated Nov. 9, 2016, Amazon Technologies, Inc., pp. 1-6.
Office Action from Chinese Application 201480021079.4, dated Feb. 1, 2018, English translation and Chinese version, Amazon Technologies, Inc., pp. 1-30.
"Research on the Data Restoration Technology of Distributed Database System", Sep. 15, 2003, Chinese version.
Oracle: "Triggers-Oracle Database Concepts", Retrieved from URL: https://Web.archive.org/web/20150918220843/https://docs.oracle.com/cd/B19306_01/server.102/b14220/triggers.htm, retrieved on Jan. 11, 2018, pp. 1-17.
Bratko, A. et al., "Exploiting Structural Information for semi-structured document categorization", Information Processing & Management, Dated May 1, 2006, vol. 42, No. 3, pp. 679-694.
Juan Trujillo et al., "A UML Based Approach for Modeling ETL Processes in data warehouses", In: Network and parallel computing, dated Oct. 16, 2003, pp. 1-14.
Anonymous, "Start informatica job when a row is updated", retrieved from URL: https://network.informatica.com/thread/13920. on Jan. 10, 2018. pp. 1-5.
Anonymous, "File based job trigger for deploying talend open studio jobs—Talend Community forum", Retrieved from URL: https//www.talendforge.org/forum/viewtopic.php?id=45580, retrieved on Jan. 10, 2018, pp. 1-3.
U.S. Appl. No. 15/926,983, filed Mar. 20, 2018, Xiaofeng Bao.
"Oracle TimesTen In-Memory Database Architectural Overview Release 6.0", Dated Jan. 1, 2006, Retrieved from the Internet: URL:http://downlaod.oracle.com/otn_hosted_doc/timesten/603/TimesTen-Documentation/arch.pdf, pp. 1-122.
Sailesh Chutani et al "The Episode File System", In Proceedings of the USENIX Winter 1992 Technical Conference, Jan. 20, 1992, pp. 43-60.

* cited by examiner ations is a divisional of U.S. patent application
DATABASE SYSTEM WITH DATABASE ENGINE AND SEPARATE DISTRIBUTED STORAGE SERVICE

RELATED APPLICATIONS

This application is a divisional of U.S. patent application Ser. No. 14/201,493, entitled "DATABASE SYSTEM WITH DATABASE ENGINE AND SEPARATE DISTRIBUTED STORAGE SERVICE, filed Mar. 7, 2014, now U.S. Pat. No. 9,514,007, which claims benefit of priority to U.S. Provisional Application Ser. No. 61/794,572, entitled "DATABASE SYSTEM WITH DATABASE ENGINE AND SEPARATE DISTRIBUTED STORAGE SERVICE", which was filed Mar. 15, 2013, and which are incorporated herein by reference in their entirety.

BACKGROUND

Distribution of various components of a software stack can in some cases provide (or support) fault tolerance (e.g., through replication), higher durability, and less expensive solutions (e.g., through the use of many smaller, less-expensive components rather than fewer large, expensive components). However, databases have historically been among the components of the software stack that are least amenable to distribution. For example, it can be difficult to distribute databases while still ensuring the so-called ACID properties (e.g., Atomicity, Consistency, Isolation, and Durability) that they are expected to provide.

While most existing relational databases are not distributed, some existing databases are "scaled out" (as opposed to being "scaled up" by merely employing a larger monolithic system) using one of two common models: a "shared nothing" model, and a "shared disk" model. In general, in a "shared nothing" model, received queries are decomposed into database shards (each of which includes a component of the query), these shards are sent to different compute nodes for query processing, and the results are collected and aggregated before they are returned. In general, in a "shared disk" model, every compute node in a cluster has access to the same underlying data. In systems that employ this model, great care must be taken to manage cache coherency. In both of these models, a large, monolithic database is replicated on multiple nodes (including all of the functionality of a stand-alone database instance), and "glue" logic is added to stitch them together. For example, in the "shared nothing" model, the glue logic may provide the functionality of a dispatcher that subdivides queries, sends them to multiple compute notes, and then combines the results. In a "shared disk" model, the glue logic may serve to fuse together the caches of multiple nodes (e.g., to manage coherency at the caching layer). These "shared nothing" and "shared disk" database systems can be costly to deploy and complex to maintain, and may over-serve many database use cases.

In traditional database systems, the data managed by a database system is stored on direct attached disks. If a disk fails, it is replaced and then must be reloaded with the appropriate data. For example, in many systems, crash recovery includes restoring the most recent snapshot from a backup system and then replaying any changes made since the last snapshot from that point forward. However, this approach does not scale well to large databases.

Figure 1:
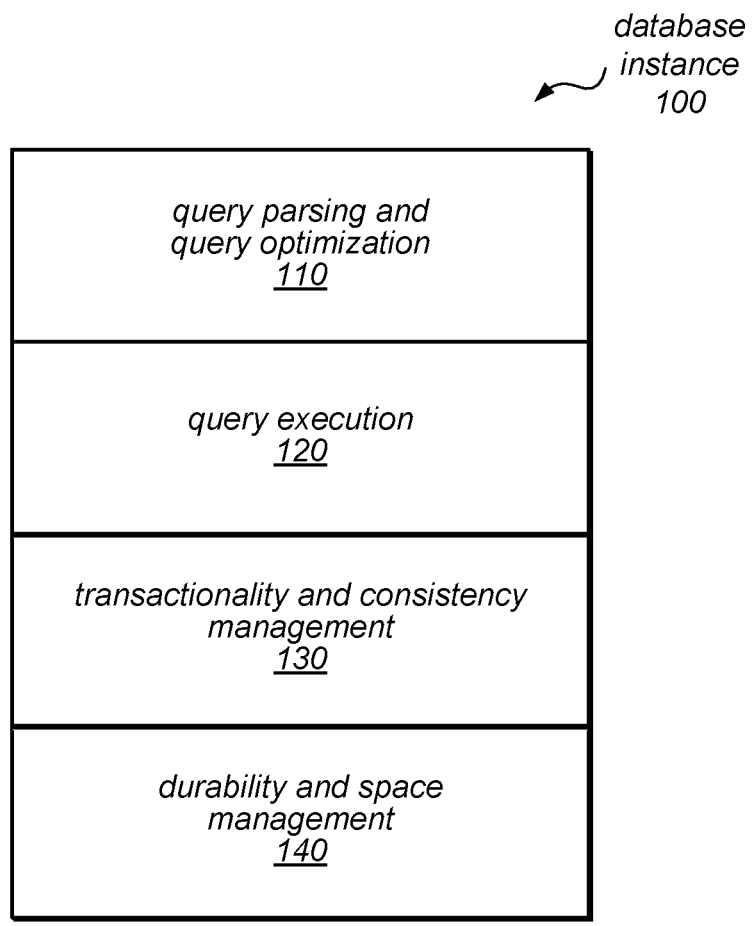
FIG. 1 is a block diagram illustrating various components of a database software stack, according to one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The systems described herein may, in some embodiments, implement a web service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

As previously noted, in typical large database systems, the entire data set needs to be restored before the database system can be restarted following a failure in the system. In these database systems, following a crash, the system must determine the last point at which it was known that all of the data pages had been flushed to disk (e.g., a checkpoint) and must replay any change logs from that point forward. For example, before the database can be made available to handle incoming queries from client processes, a system process must read in all of the data pages that were changed after the determined checkpoint and apply each of the applicable change log records that had not already been applied to those data pages.

In some embodiments, the database systems described herein may be able to restart the database engine following a failure (e.g., to make the database available to accept and service queries) almost immediately after a database crash, without having to wait for the entire data set to be restored. Instead, queries can be received and serviced while crash recovery is performed lazily by one or more background threads. For example, following a crash, multiple background threads may operate in parallel on different storage nodes to reconstruct data pages from corresponding redo logs. In the meantime, if an incoming query targets a data page that has not yet been reconstructed, the storage layer may be configured to re-create that data page on the fly from the appropriate redo logs.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

FIG. 1 is a block diagram illustrating various components of a database software stack, according to one embodiment. As illustrated in this example, a database instance may include multiple functional components (or layers), each of which provides a portion of the functionality of the database instance. In this example, database instance 100 includes a query parsing and query optimization layer (shown as 110), a query execution layer (shown as 120), a transactionality and consistency management layer (shown as 130), and a durability and space management layer (shown as 140). As noted above, in some existing database systems, scaling a database instance may involve duplicating the entire database instance one or more times (including all of the layers illustrated in FIG. 1), and then adding glue logic to stitch them together. In some embodiments, the systems described herein may instead offload the functionality of durability and space management layer 140 from the database tier to a separate storage layer, and may distribute that functionality across multiple storage nodes in the storage layer.

In some embodiments, the database systems described herein may retain much of the structure of the upper half of the database instance illustrated in FIG. 1, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using only metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), cancelling or aborting a query, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed database-optimized storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum. Similarly, for a read request directed to a particular segment, the client-side driver may route the read request to all of the nodes on which the segment is stored (e.g., asynchronously and in parallel, at substantially the same time). As soon as the client-side driver receives the requested data from a read quorum of the storage nodes in the protection group, it may return the requested data to the database tier (e.g., to the database engine head node).

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database table receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database tables, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. For example, in some embodiments, in response to a request to make a change to a database table, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. For example, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 2:
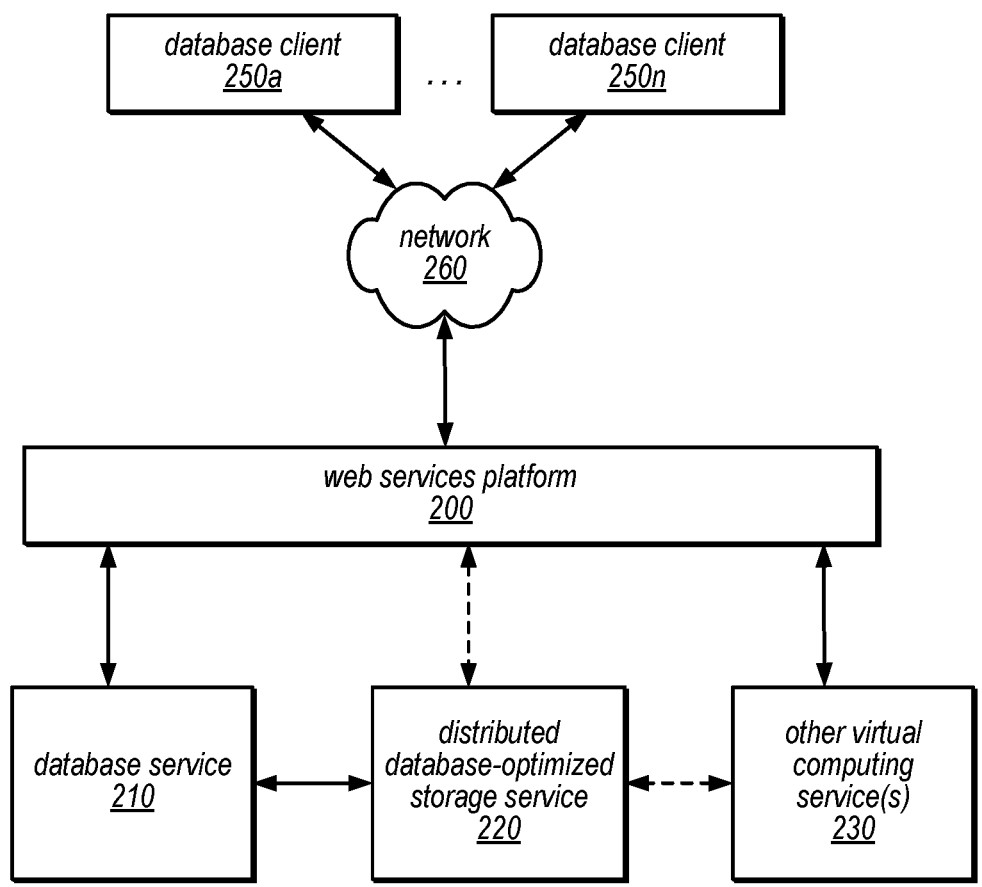
FIG. 2 is a block diagram illustrating a service system architecture that may be configured to implement a web services-based database service, according to some embodiments.

One embodiment of a service system architecture that may be configured to implement a web services-based database service is illustrated in FIG. 2. In the illustrated embodiment, a number of clients (shown as database clients 250a-250n) may be configured to interact with a web services platform 200 via a network 260. Web services platform 200 may be configured to interface with one or more instances of a database service 210, a distributed database-optimized storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 14 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit web services requests to web services platform 200 via network 260, including requests for database services. For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing web services requests without necessarily implementing full browser support for all types of web-based data. That is, client 250 may be an application configured to interact directly with web services platform 200. In some embodiments, client 250 may be configured to generate web services requests according to a Representational State Transfer (REST)-style web services architecture, a document- or message-based web services architecture, or another suitable web services architecture.

In some embodiments, a client 250 (e.g., a database service client) may be configured to provide access to web services-based storage of database tables to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model of FIG. 1. Instead, the details of interfacing to Web services platform 200 may be coordinated by client 250 and the operating system or file system on behalf of applications executing within the operating system environment.

Clients 250 may convey web services requests to and receive responses from web services platform 200 via network 260. In various embodiments, network 260 may encompass any suitable combination of networking hardware and protocols necessary to establish web-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and web services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and web services platform 200. It is noted that in some embodiments, clients 250 may communicate with web services platform 200 using a private network rather than the public Internet. For example, clients 250 may be provisioned within the same enterprise as a database service system (e.g., a system that implements database service 210 and/or distributed database-optimized storage service 220). In such a case, clients 250 may communicate with platform 200 entirely through a private network 260 (e.g., a LAN or WAN that may use Internet-based communication protocols but which is not publicly accessible).

Generally speaking, web services platform 200 may be configured to implement one or more service endpoints configured to receive and process web services requests, such as requests to access data pages (or records thereof). For example, web services platform 200 may include hardware and/or software configured to implement a particular endpoint, such that an HTTP-based web services request directed to that endpoint is properly received and processed. In one embodiment, web services platform 200 may be implemented as a server system configured to receive web services requests from clients 250 and to forward them to components of a system that implements database service 210, distributed database-optimized storage service 220 and/or another virtual computing service 230 for processing. In other embodiments, web services platform 200 may be configured as a number of distinct systems (e.g., in a cluster topology) implementing load balancing and other request management features configured to dynamically manage large-scale web services request processing loads. In various embodiments, web services platform 200 may be configured to support REST-style or document-based (e.g., SOAP-based) types of web services requests.

In addition to functioning as an addressable endpoint for clients' web services requests, in some embodiments, web services platform 200 may implement various client management features. For example, platform 200 may coordinate the metering and accounting of client usage of web services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed database-optimized storage service 220 and/or another virtual computing service 230 (or the underlying systems that implement those services).

In some embodiments, platform 200 may also implement user authentication and access control procedures. For example, for a given web services request to access a particular database table, platform 200 may be configured to ascertain whether the client 250 associated with the request is authorized to access the particular database table. Platform 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding web services request, for example by returning a response to the requesting client 250 indicating an error condition. Various access control policies may be stored as records or lists of access control information by database service 210, distributed database-optimized storage service 220 and/or other virtual computing services 230.

It is noted that while web services platform 200 may represent the primary interface through which clients 250 may access the features of a database system that implements database service 210, it need not represent the sole interface to such features. For example, an alternate API that may be distinct from a web services interface may be used to allow clients internal to the enterprise providing the database system to bypass web services platform 200. Note that in many of the examples described herein, distributed database-optimized storage service 220 may be internal to a computing system or an enterprise system that provides database services to clients 250, and may not be exposed to external clients (e.g., users or client applications). In such embodiments, the internal "client" (e.g., database service 210) may access distributed database-optimized storage service 220 over a local or private network, shown as the solid line between distributed database-optimized storage service 220 and database service 210 (e.g., through an API directly between the systems that implement these services). In such embodiments, the use of distributed database-optimized storage service 220 in storing database tables on behalf of clients 250 may be transparent to those clients. In other embodiments, distributed database-optimized storage service 220 may be exposed to clients 250 through web services platform 200 to provide storage of database tables or other information for applications other than those that rely on database service 210 for database management. This is illustrated in FIG. 2 by the dashed line between web services platform 200 and distributed database-optimized storage service 220. In such embodiments, clients of the distributed database-optimized storage service 220 may access distributed database-optimized storage service 220 via network 260 (e.g., over the Internet). In some embodiments, a virtual computing service 230 may be configured to receive storage services from distributed database-optimized storage service 220 (e.g., through an API directly between the virtual computing service 230 and distributed database-optimized storage service 220) to store objects used in performing computing services 230 on behalf of a client 250. This is illustrated in FIG. 2 by the dashed line between virtual computing service 230 and distributed database-optimized storage service 220. In some cases, the accounting and/or credentialing services of platform 200 may be unnecessary for internal clients such as administrative clients or between service components within the same enterprise.

Note that in various embodiments, different storage policies may be implemented by database service 210 and/or distributed database-optimized storage service 220. Examples of such storage policies may include a durability policy (e.g., a policy indicating the number of instances of a database table (or data page thereof) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, distributed database-optimized storage service 220 may implement a higher durability for redo log records than for data pages.

Figure 3:
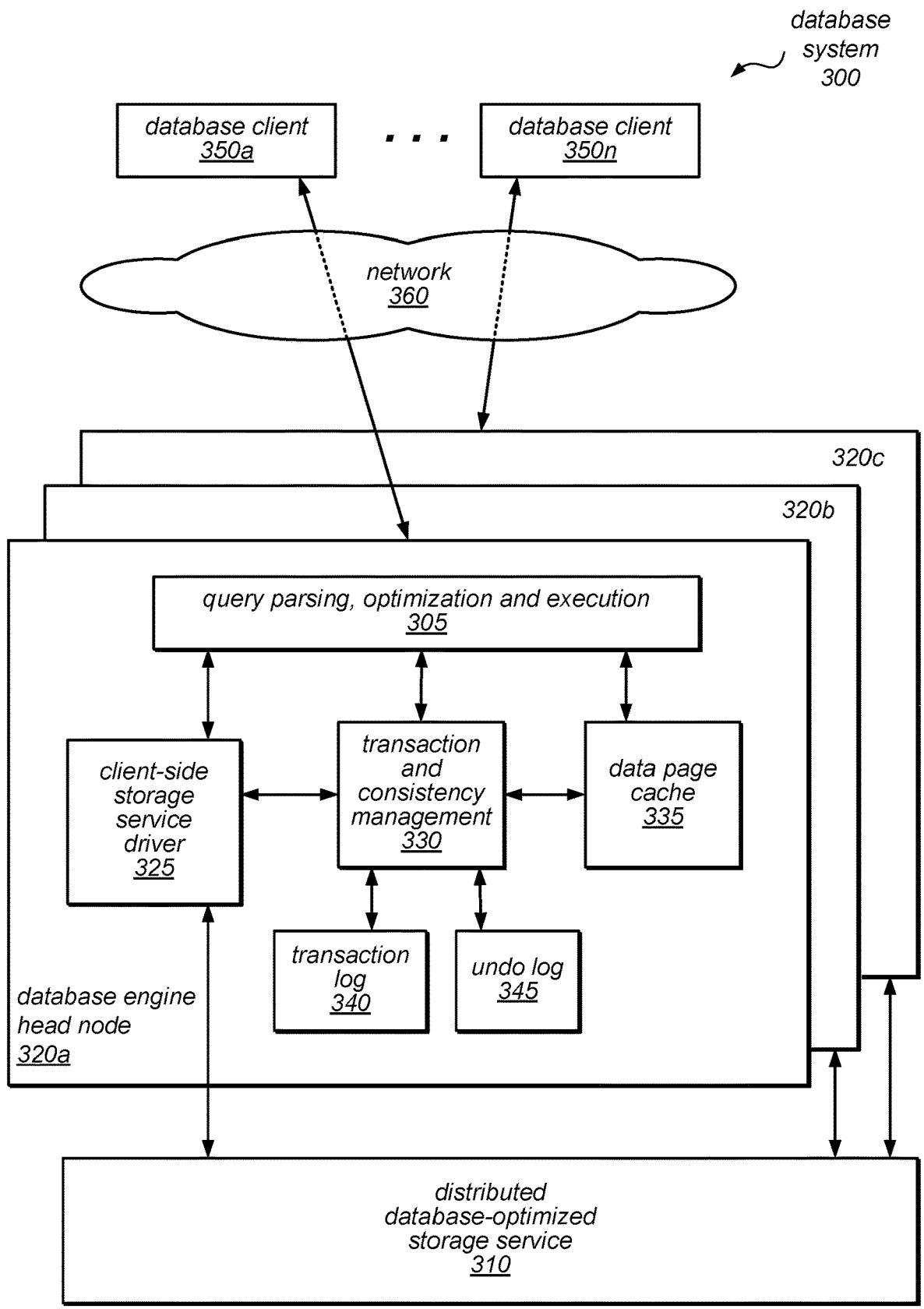
FIG. 3 is a block diagram illustrating various components of a database system that includes a database engine and a separate distributed database storage service, according to one embodiment.

FIG. 3 is a block diagram illustrating various components of a database system that includes a database engine and a separate distributed database storage service, according to one embodiment. In this example, database system 300 includes a respective database engine head node 320 for each of several database tables and a distributed database-optimized storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, distributed database-optimized storage service 310, which may be employed by the database system to store data pages of one or more database tables (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed database-optimized storage service 310 may perform various storage, access, change logging, recovery, and/or space management operations in a manner that is invisible to storage clients 350a-350n.

As previously noted, each database instance may include a single database engine head node 320 that receives requests from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed database-optimized storage service 310, receive write acknowledgements from distributed database-optimized storage service 310, receive requested data pages from distributed database-optimized storage service 310, and/or return data pages, error messages, or other responses to query parsing, optimization, and execution component 305 (which may, in turn, return them to database client 350a).

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the distributed database-optimized storage systems described herein may organize data in various logical volumes, segments, and pages for storage on one or more storage nodes. For example, in some embodiments, each database table is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the database table is being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed database-optimized storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database table. Each write operation may be encoded in a User Log Record (ULR), which represents a logical, ordered mutation to the contents of a single user page within the volume. As noted above, a ULR may also be referred to herein as a redo log record. Each ULR may include a unique LSN, or Logical Sequence Number. Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, an NVMRAM device (e.g., one or more NVDIMMs), or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
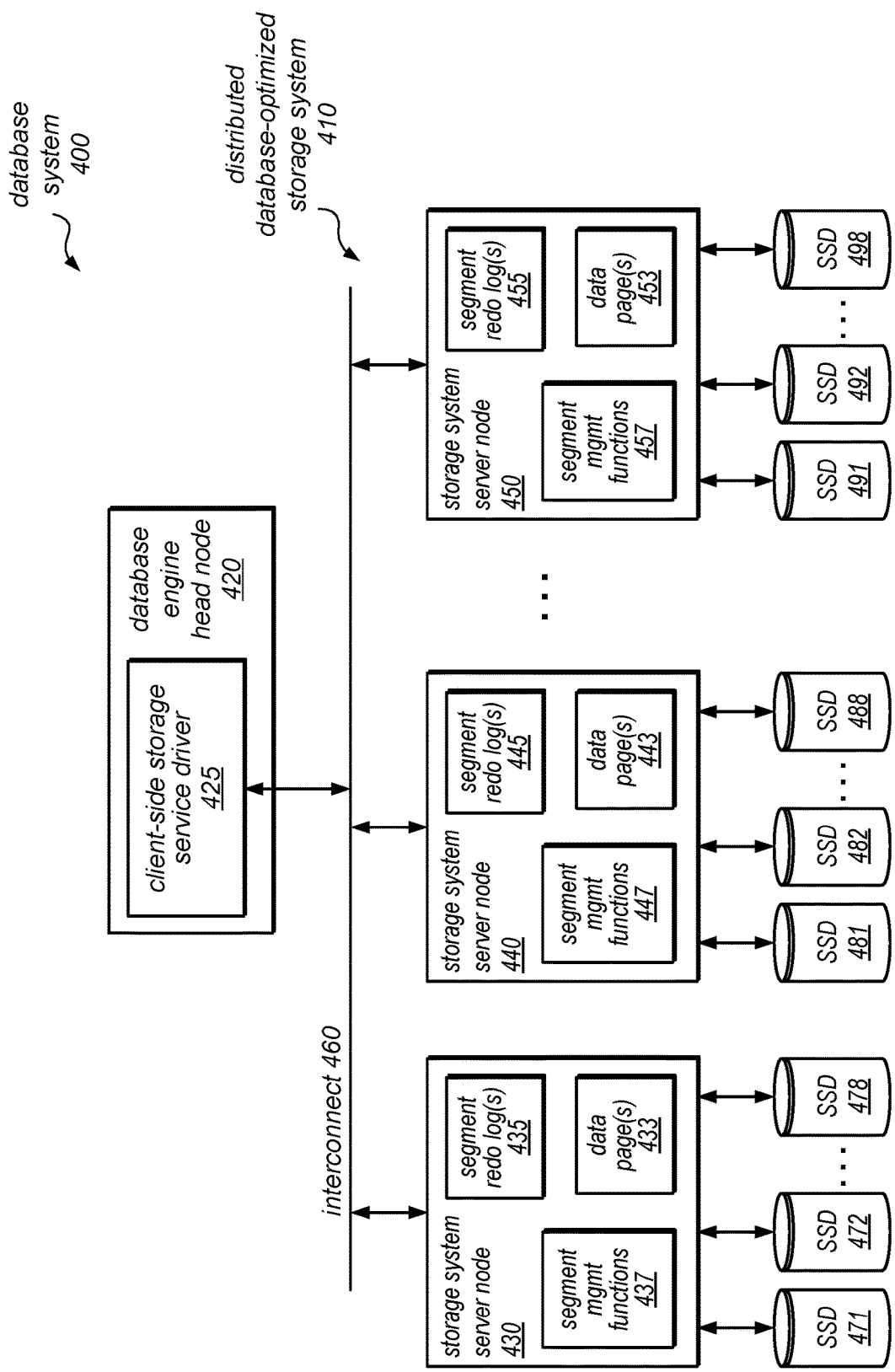
FIG. 4 is a block diagram illustrating a distributed database-optimized storage system, according to one embodiment.

One embodiment of a distributed database-optimized storage system is illustrated by the block diagram in FIG. 4. In this example, a database system 400 includes a distributed database-optimized storage system 410, which communicates with a database engine head node 420 over interconnect 460. As in the example illustrated in FIG. 3, database engine head node 420 may include a client-side storage service driver 425. In this example, distributed database-optimized storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

As previously noted, in some embodiments, a sector is the unit of alignment on an SSD and may be the maximum size on an SSD that can be written without the risk that the write will only be partially completed. For example, the sector size for various solid-state drives and spinning media may be 4 KB. In some embodiments of the distributed database-optimized storage systems described herein, each and every sector may include have a 64-bit (8 byte) CRC at the beginning of the sector, regardless of the higher-level entity of which the sector is a part. In such embodiments, this CRC (which may be validated every time a sector is read from SSD) may be used in detecting corruptions. In some embodiments, each and every sector may also include a "sector type" byte whose value identifies the sector as a log sector, a data sector, or an uninitialized sector. For example, in some embodiments, a sector type byte value of 0 may indicate that the sector is uninitialized.

Figure 5:
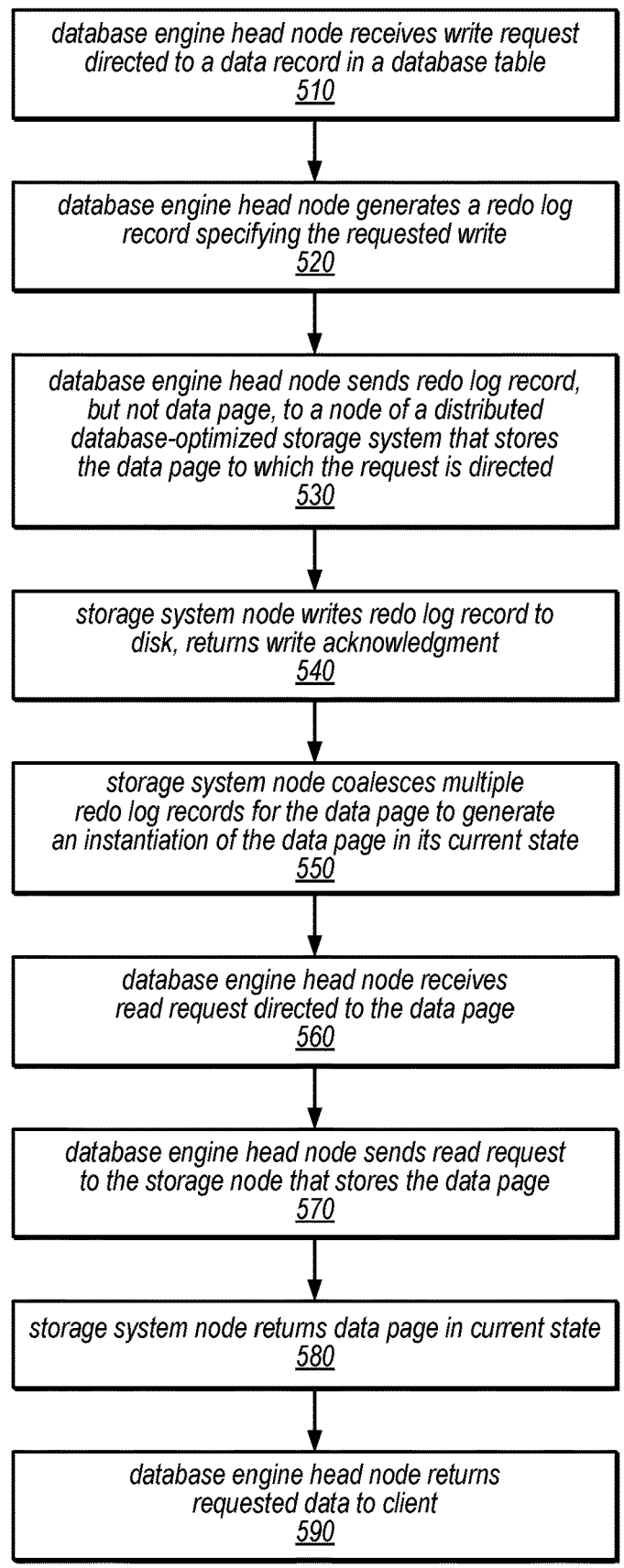
FIG. 5 is a flow diagram illustrating one embodiment of a method for accessing data in a database system that includes a database engine and a separate distributed database storage service.

One embodiment of a method for accessing data in a database system that includes a database engine and a separate distributed database storage service, such as those described herein, is illustrated by the flow diagram in FIG. 5. As illustrated at 510, in this example, the method may include a database engine head node receiving (e.g., from a database client) a write request directed to a data record in a database table. For example, the write request may specify that a new data record should be added to the database table (or to a particular data page thereof) or may specify a modification to an existing data record in a particular data page of the database table. The method may include the database engine head node generating a redo log record specifying the requested write, as in 520, and sending the redo log record (but not the particular data page to which the request is directed) to a node of a distributed database-optimized storage system that stores the particular data page, as in 530.

As illustrated in this example, the method may include, in response to receiving the redo log record, the storage system node writing the redo log record to disk (or to another type of persistent storage media), and returning a write acknowledgment to the database engine head node, as in 540. In some embodiments, in response to receiving the write acknowledgement, the database engine head node may return a corresponding write acknowledgement to the client from whom the write request was received (not shown). As illustrated in this example, at some point in time (e.g., at a point in time subsequent to receiving the redo log record and returning the write acknowledgement), the method may include the storage system node coalescing multiple redo log records for the particular data page (including, for example, the redo log record that was written to disk at step 540) to generate an instantiation of the particular data page in its current state, as in 550. For example, coalescing the redo log may include applying to a previously instantiated version of the particular data page all of the redo logs that have been received by the storage system for the particular data page but that have not yet been applied to an instance of the particular data page to provide an up-to-date version of the particular data page. Note that in some embodiments, an up-to-date version of the particular data page may be generated directly from one or more redo logs, e.g., without applying them to a previously stored version of the particular data page.

As illustrated in FIG. 5, the method may also include (e.g., at some point subsequent to coalescing redo logs to create an up-to-date version of the particular data page) the database engine head node receiving a read request directed to the particular data page, as in 560. In response, the database engine head node may send a corresponding read request to the storage node that stores the particular data page, as in 570. Note that, in this example, it is assumed that the database engine head node does not store a current version of the particular data page in its cache. Otherwise, the method may include database engine head node responding to the read request itself (e.g., by returning the requested data from its cache), rather than sending a corresponding read request to the storage system node. As illustrated in this example, the method may include the storage system node returning the particular data page to the database engine head node in its current state, as in 580, after which the database engine head node may return the requested data to the client from whom the read request was received, as in 590.

In various embodiments, the version of the particular data page that is returned to the database engine head node (e.g., in step 580) may be the same version that was generated by the coalescing operation in step 550, or may be a more recent version that was created by a subsequent coalescing operation (e.g., one that applied additional redo log records that were subsequent to the coalescing operation in step 550). For example, an additional coalescing operation may have been performed at the storage system node in response to the receipt of the read request from the database engine head node, as part of a database crash recovery operation, or in response to another type of trigger, in different embodiments. Note that in some embodiments, the operations illustrated in FIG. 5 for accessing data in a database system that includes a database engine and a separate distributed database storage service may be performed automatically (e.g., without user intervention) in the database system in response to receiving a request to access the data.

In some embodiments, each of the storage system server nodes in the distributed database-optimized storage system may implement a set of processes running on the node server's operating system that manage communication with the database engine head node, e.g., to receive redo logs, send back data pages, etc. In some embodiments, all data blocks written to the distributed database-optimized storage system may be backed up to long-term and/or archival storage (e.g., in a remote key-value durable backup storage system).

Figure 6:
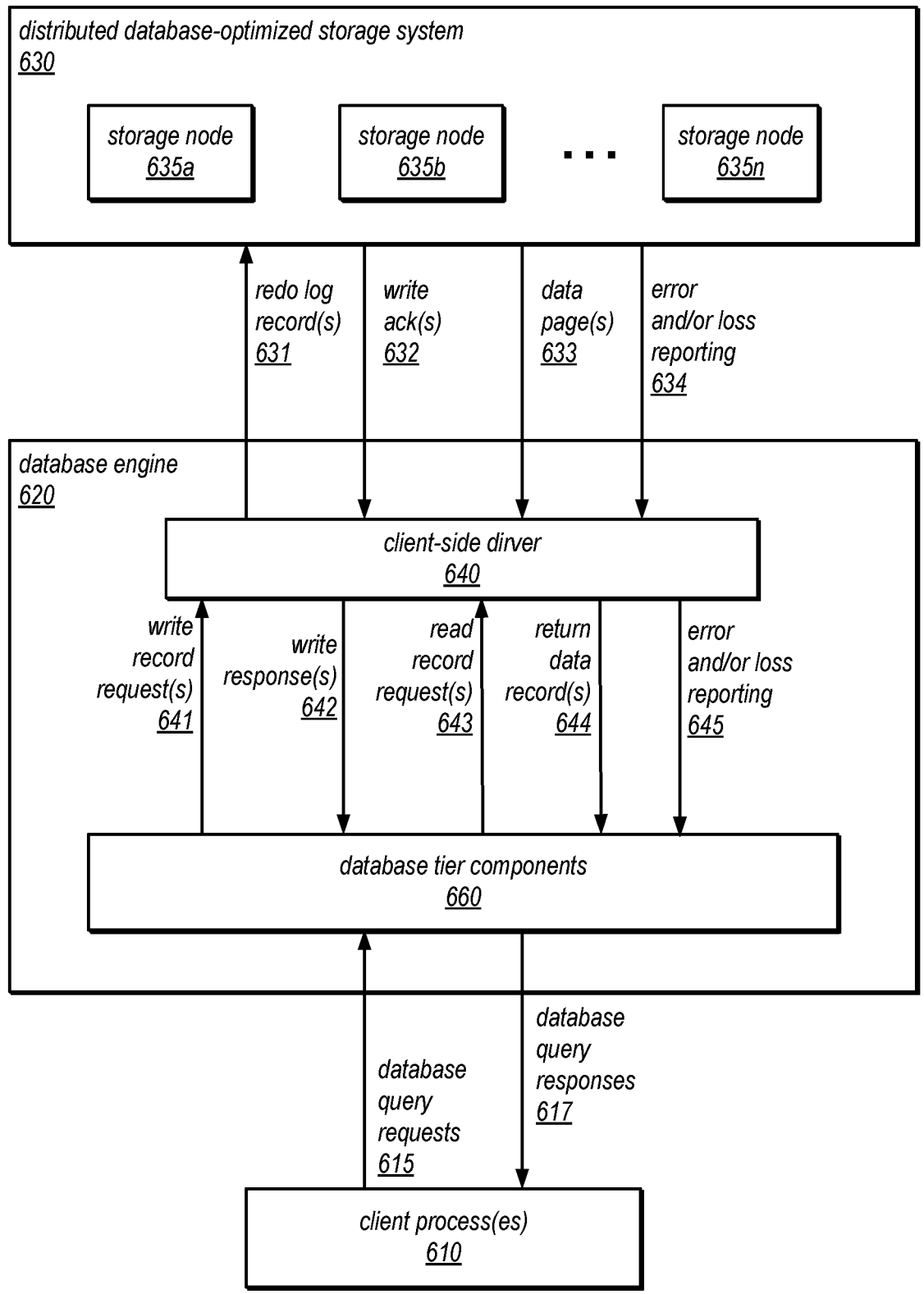
FIG. 6 is a block diagram illustrating the use of a separate distributed database-optimized storage system in a database system, according to one embodiment.

FIG. 6 is a block diagram illustrating the use of a separate distributed database-optimized storage system in a database system, according to one embodiment. In this example, one or more client processes 610 may store data to one or more database tables maintained by a database system that includes a database engine 620 and a distributed database-optimized storage system 630. In the example illustrated in FIG. 6, database engine 620 includes database tier components 660 and client-side driver 640 (which serves as the interface between distributed database-optimized storage system 630 and database tier components 660). In some embodiments, database tier components 660 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 610 may send database query requests 615 (which may include read and/or write requests targeting data stored on one or more of the storage nodes 635a-635n) to database tier components 660, and may receive database query responses 617 from database tier components 660 (e.g., responses that include write acknowledgements and/or requested data). Each database query request 615 that includes a request to write to a data page may be parsed and optimized to generate one or more write record requests 641, which may be sent to client-side driver 640 for subsequent routing to distributed database-optimized storage system 630. In this example, client-side driver 640 may generate one or more redo log records 631 corresponding to each write record request 641, and may send them to specific ones of the storage nodes 635 of distributed database-optimized storage system 630. Distributed database-optimized storage system 630 may return a corresponding write acknowledgement 623 for each redo log record 631 to database engine 620 (specifically to client-side driver 640). Client-side driver 640 may pass these write acknowledgements to database tier components 660 (as write responses 642), which may then send corresponding responses (e.g., write acknowledgements) to one or more client processes 610 as one of database query responses 617.

In this example, each database query request 615 that includes a request to read a data page may be parsed and optimized to generate one or more read record requests 643, which may be sent to clients-side driver 640 for subsequent routing to distributed database-optimized storage system 630. In this example, client-side driver 640 may send these requests to specific ones of the storage nodes 635 of distributed database-optimized storage system 630, and distributed database-optimized storage system 630 may return the requested data pages 633 to database engine 620 (specifically to client-side driver 640). Client-side driver 640 may send the returned data pages to the database tier components 660 as return data records 644, and database tier components 660 may then send the data pages to one or more client processes 610 as database query responses 617.

In some embodiments, various error and/or data loss messages 634 may be sent from distributed database-optimized storage system 630 to database engine 620 (specifically to client-side driver 640). These messages may be passed from client-side driver 640 to database tier components 660 as error and/or loss reporting messages 645, and then to one or more client processes 610 along with (or instead of) a database query response 617.

In some embodiments, the APIs 631-634 of distributed database-optimized storage system 630 and the APIs 641-645 of client-side driver 640 may expose the functionality of the distributed database-optimized storage system 630 to database engine 620 as if database engine 620 were a client of distributed database-optimized storage system 630. For example, database engine 620 (through client-side driver 640) may write redo log records or request data pages through these APIs to perform (or facilitate the performance of) various operations of the database system implemented by the combination of database engine 620 and distributed database-optimized storage system 630 (e.g., storage, access, change logging, recovery, and/or space management operations). As illustrated in FIG. 6, distributed database-optimized storage system 630 may store data blocks on storage nodes 635a-635n, each of which may have multiple attached SSDs. In some embodiments, distributed database-optimized storage system 630 may provide high durability for stored data block through the application of various types of redundancy schemes.

Note that in various embodiments, the API calls and responses between database engine 620 and distributed database-optimized storage system 630 (e.g., APIs 631-634) and/or the API calls and responses between client-side driver 640 and database tier components 660 (e.g., APIs 641-645) in FIG. 6 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C # and Perl to support integration with database engine 620 and/or distributed database-optimized storage system 630.

As noted above, in some embodiments, the functional components of a database system may be partitioned between those that are performed by the database engine and those that are performed in a separate, distributed, database-optimized storage system. In one specific example, in response to receiving a request from a client process (or a thread thereof) to insert something into a database table (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed database-optimized storage service and to send it to the distributed database-optimized storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log, both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

Figure 7:
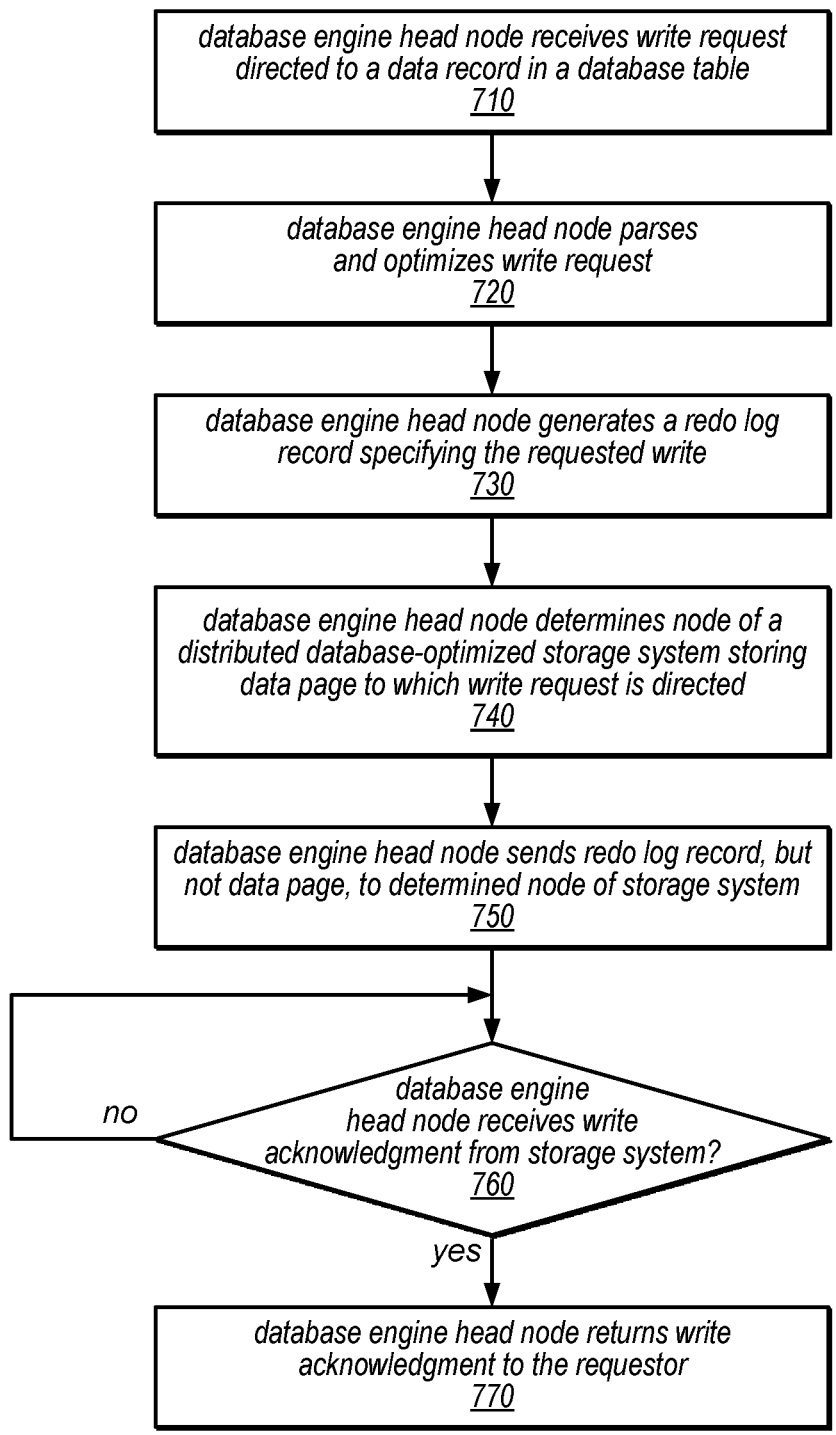
FIG. 7 is a flow diagram illustrating one embodiment of a method for performing a write operation in a database system, from the perspective of the database engine.

One embodiment of a method for performing a write operation in a database system, from the perspective of the database engine, is illustrated by the flow diagram in FIG. 7. As illustrated at 710, in this example, the method may include the database engine head node receiving (e.g., from a database client) a write request directed to a data record in a database table. For example, the write request may specify that a new data record should be added to the database table (or to a particular data page thereof) or may specify a modification to an existing data record in a particular data page of the database table. The method may also include the database engine head node (or a particular component thereof) parsing and/or optimizing the write request, as in 720. For example, in some embodiments, the database engine head node may be responsible for generating a query execution plan. As illustrated in FIG. 7, the method may include the database engine head node generating a redo log record specifying the requested write, as in 730, and the database engine head node (or, more specifically, a client-side storage service driver on the database engine head node) determining the node of a distributed database-optimized storage system that stores the particular data page to which the write request is directed, as in 740.

As illustrated in this example, the method may include the database engine head node (or, more specifically, the client-side storage service driver on the database engine head node) sending the redo log record, but not any version of the particular data page, to the determined node of storage system, as in 750. As illustrated in FIG. 7, there may be no other action taken by the database engine head node with respect to the write request until (and unless) the database engine head node (or, more specifically, the client-side storage service driver on the database engine head node) receives an acknowledgment of the write from the storage system. Once this acknowledgement is received (shown as the positive exit from 760), the method may include the database engine head node returning a corresponding write acknowledgment to the requestor (e.g., to the client from whom the write request was received), as in 770. Note that in some embodiments, if a write acknowledgement is not received from the storage system within a pre-determined time period, the database engine head node (or, more specifically, the client-side storage service driver on the database engine head node) may be configured to determine that the determined storage node has failed (or is degraded) or that some other error condition exists in the storage system. Note also that the operations illustrated in FIG. 7 for performing a write operation may be performed automatically (e.g., without user intervention) in the database system in response to receiving a write request.

Figure 8:
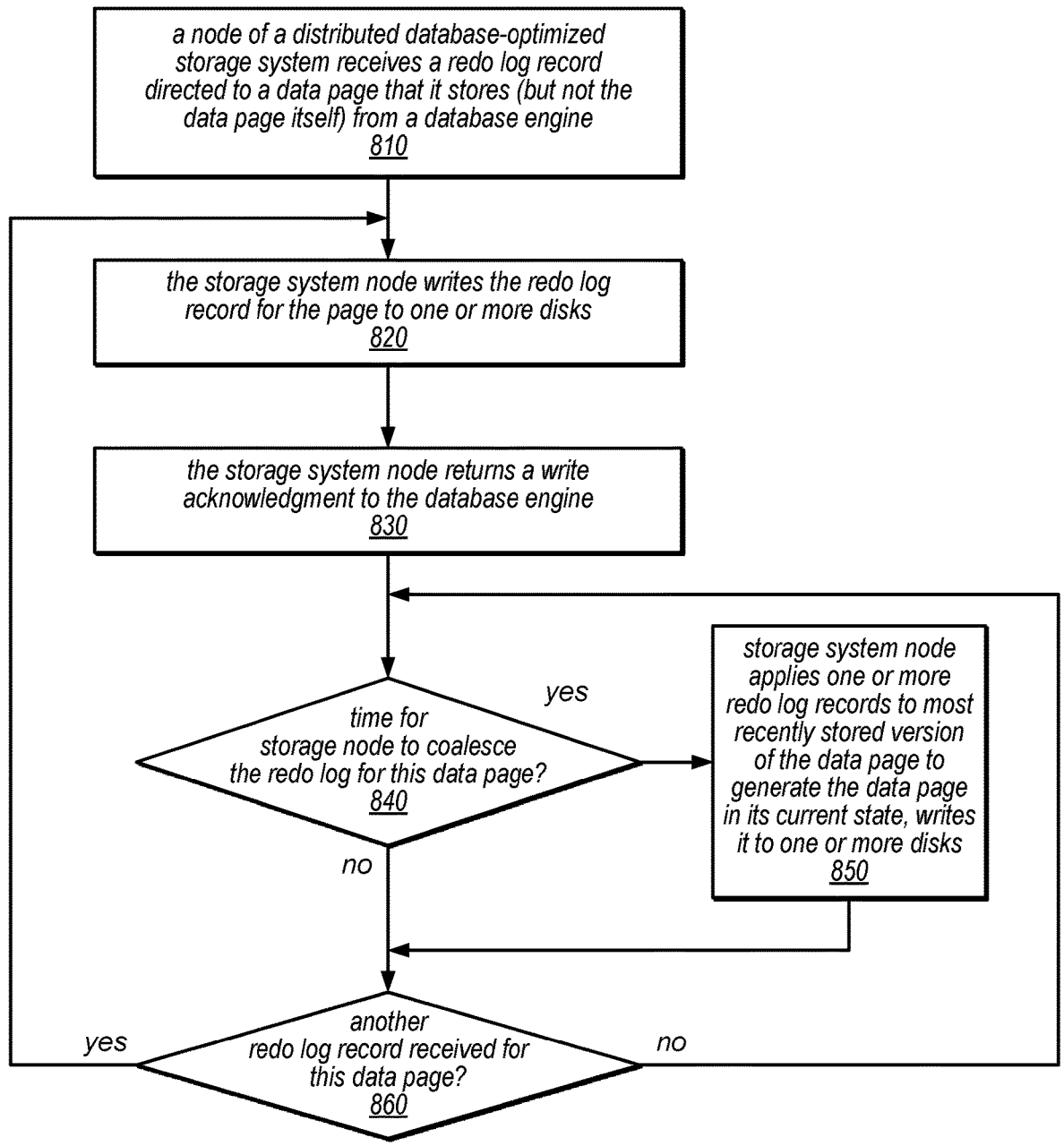
FIG. 8 is a flow diagram illustrating one embodiment of a method for performing a write operation in a database system, from the perspective of a distributed database-optimized storage system.

One embodiment of a method for performing a write operation in a database system, from the perspective of a distributed database-optimized storage system, is illustrated by the flow diagram in FIG. 8. As illustrated at 810, in this example, the method may include a node of a distributed database-optimized storage system receiving a redo log record that is directed to a particular data page that the node stores (but not any version of the particular data page itself) from a database engine (e.g., from a client-side storage service driver of a database head node), or from another client of the storage system. In response to receiving the redo log record, the method may include the storage system node writing the redo log record for the page to one or more disks (or to another type of persistent storage media), as in 820. For example, the storage system node may append the redo log record to a redo log for the particular data page that is stored on a particular disk, or to any of a number of replicas of such a redo log that are stored on one or more disks in the same availability zone or in each of two or more different availability zones, in different embodiments. Once one or more copies of the redo log record have been successfully written (according to a system-wide, application-specific, or client-specified durability policy), the method may also include the storage system node returning a write acknowledgment to the database engine (or other client of the storage system) as in 830. Note that the storage system node may return the write acknowledgement to the database engine at any time after successfully writing the redo log record, regardless of whether or not the redo log record has been applied to a previously instantiated version of the particular data page to which it is directed on the storage system node yet.

As illustrated in this example, if it is time for the storage system node to coalesce one or more redo log records for the particular data page to create an up-to-date version of the particular data page (shown as the positive exit from 840), the method may include the storage system node applying one or more redo log records to the most recently stored version of the particular data page to generate a new version of the particular data page in its current state, and writing that new version of the particular data page to one or more disks (as in 850). For example, the coalesce operation may include the application of all redo log records that were received since the last coalesce operation (and/or that have not yet been applied to any version of the particular data page) to the most recently instantiated version of the particular data page. In other embodiments, a current version of the particular data page may be generated directly from one or more redo logs, e.g., without applying them to a previously stored version of the particular data page. As described herein, there may be a variety of ways to determine when it is time to coalesce pending redo log records for a given data page, in different embodiments. For example, a coalesce operation may be triggered for a data page at regular (e.g., periodic) time intervals, in response to receiving a single redo log targeting the data page, in response to having received a pre-determined number of redo log records targeting the data page or a pre-determined number of redo log records targeting the data page within a given time period, in response to receiving a read request targeting the data page, in response to the initiation of a crash recovery operation, or according to any other suitable policy.

As illustrated in FIG. 8, if it is not time for the storage system node to coalesce redo log records for the particular data page (shown as the negative exit from 840), but another redo log record targeting the particular data page is received (shown as the positive exit from 860), the method may include repeating the operations illustrated at 820-860 for the additional redo log record. In this example, as more redo log records targeting the particular data page are received by the storage system, the storage system node may repeat the operations illustrated at 820-860 for each additional redo log record, and the storage system node may coalesce the redo log records for the particular data page from time to time, according to one or more applicable triggers and/or policies. This is illustrated in FIG. 8 by the feedback from the positive exit of 860 to 820, and the feedback from the negative exit of 860 to 840. Note that the operations illustrated in FIG. 8 for performing a write operation may be performed automatically (e.g., without user intervention) in the storage system in response to receiving a redo log record.

Note that, in some embodiments, some data pages (e.g., data pages that are rarely, if ever, accessed) may never be generated (e.g., through a coalesce operation) and/or persisted in memory. For example, in some embodiments, any redo log records directed to such data pages may be stored (e.g., persisted in memory) by one or more storage system nodes, but these redo log records may not be used to generate a complete version of those data pages until or unless a request to read them is received. In such embodiments, even if a version of such a data page is generated (e.g., in response to a read request), it may not be persisted in memory (e.g., if it is unlikely to be accessed again soon, often, or ever), but instead may be discarded at any point after it is returned to the requestor.

A variety of different allocation models may be implemented for an SSD, in different embodiments. For example, in some embodiments, log entry pages and physical application pages may be allocated from a single heap of pages associated with an SSD device. This approach may have the advantage of leaving the relative amount of storage consumed by log pages and data pages to remain unspecified and to adapt automatically to usage. It may also have the advantage of allowing pages to remain unprepared until they are used, and repurposed at will without preparation. In other embodiments, an allocation model may partition the storage device into separate spaces for log entries and data pages. Once such allocation model is illustrated by the block diagram in FIG. 9 and described below.

Figure 9:
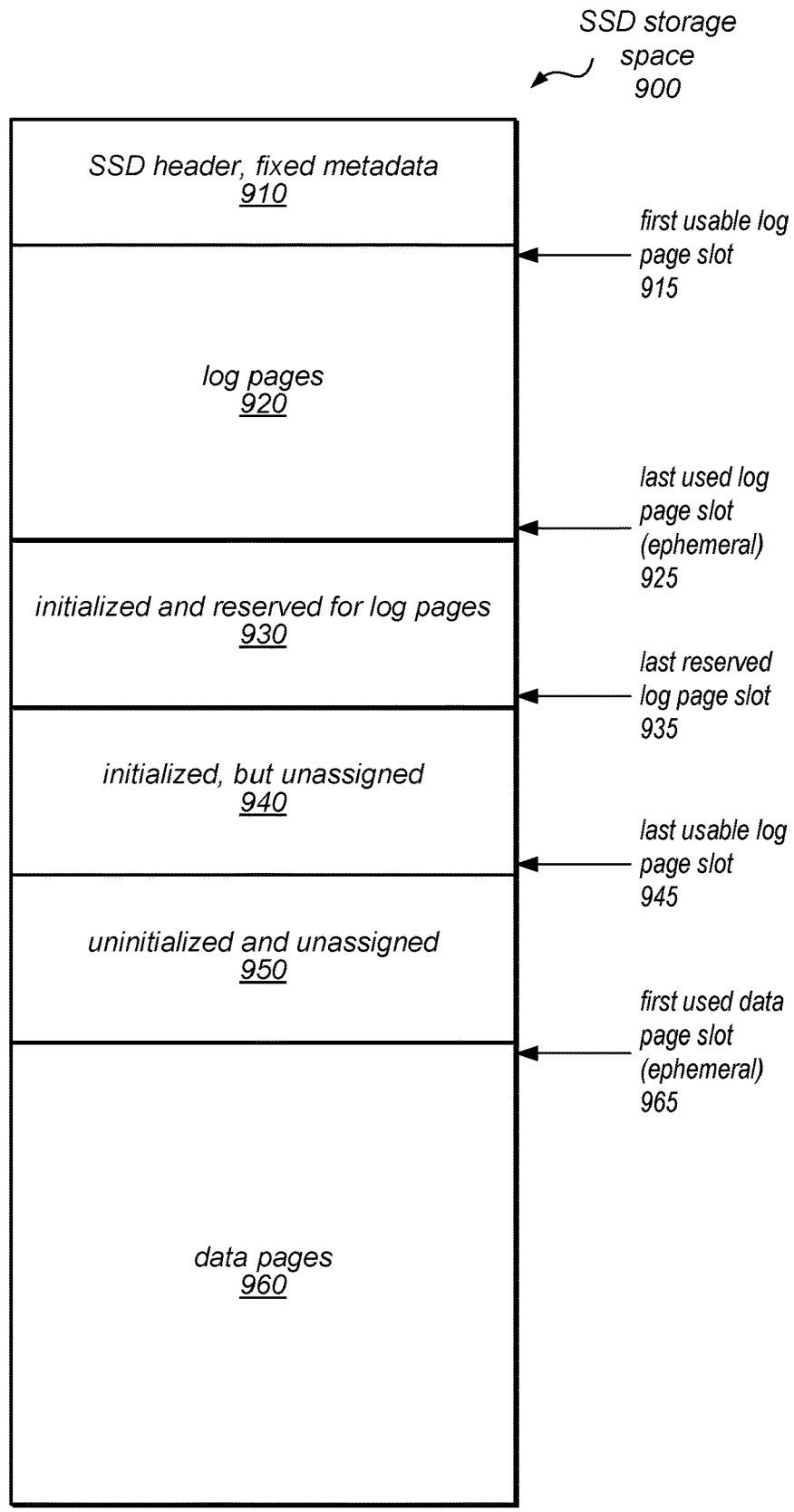
FIG. 9 is a block diagram illustrating how data and metadata may be stored on a given node of a distributed database-optimized storage system, according to one embodiment.

FIG. 9 is a block diagram illustrating how data and metadata may be stored on a given storage node (or persistent storage device) of a distributed database-optimized storage system, according to one embodiment. In this example, SSD storage space 900 stores an SSD header and other fixed metadata in the portion of the space labeled 910. It stores log pages in the portion of the space labeled 920, and includes a space labeled 930 that is initialized and reserved for additional log pages. One portion of SSD storage space 900 (shown as 940) is initialized, but unassigned, and another portion of the space (shown as 950) is uninitialized and unassigned. Finally, the portion of SSD storage space 900 labeled 960 stores data pages.

In this example, the first usable log page slot is noted as 915, and the last used log page slot (ephemeral) is noted as 925. The last reserved log page slot is noted as 935, and the last usable log page slot is noted as 945. In this example, the first used data page slot (ephemeral) is noted as 965. In some embodiments, the positions of each of these elements (915, 925, 935, 945, and 965) within SSD storage space 900 may be identified by a respective pointer.

In allocation approach illustrated in FIG. 9, valid log pages may be packed into the beginning of the flat storage space. Holes that open up due to log pages being freed may be reused before additional log page slots farther into the address space are used. For example, in the worst case, the first n log page slots contain valid log data, where n is the largest number of valid log pages that have ever simultaneously existed. In this example, valid data pages may be packed into the end of the flat storage space. Holes that open up due to data pages being freed may be reused before additional data page slots lower in the address space are used. For example, in the worst case, the last m data pages contain valid data, where m is the largest number of valid data pages that have ever simultaneously existed.

In some embodiments, before a log page slot can become part of the potential set of valid log page entries, it may need to be initialized to a value that cannot be confused for a valid future log entry page. This is implicitly true for recycled log page slots, since a retired log page has enough metadata to never be confused for a new valid log page. However, when a storage device is first initialized, or when space is reclaimed that had potentially been used to store application data pages, the log page slots may need to be initialized before they are added to the log page slot pool. In some embodiments, rebalancing/reclaiming log space may be performed as a background task.

In the example illustrated in FIG. 9, the current log page slot pool includes the area between the first usable log page slot (at 915) and the last reserved log page slot (925). In some embodiments, this pool may safely grow up to last usable log page slot (925) without re-initialization of new log page slots (e.g., by persisting an update to the pointer that identifies the last reserved log page slot, 935). In this example, beyond the last usable log page slot (which is identified by pointer 945), the pool may grow up to the first used data page slot (which is identified by pointer 965) by persisting initialized log page slots and persistently updating the pointer for the last usable log page slot (945). In this example, the previously uninitialized and unassigned portion of the SSD storage space 900 shown as 950 may be pressed into service to store log pages. In some embodiments, the current log page slot pool may be shrunk down to the position of the last used log page slot (which is identified by pointer) by persisting an update to the pointer for the last reserved log page slot (935).

In the example illustrated in FIG. 9, the current data page slot pool includes the area between the last usable log page slot (which is identified by pointer 945) and the end of SSD storage space 900. In some embodiments, the data page pool may be safely grown to the position identified by the pointer to the last reserved log page slot (935) by persisting an update to the pointer to the last usable log page slot (945). In this example, the previously initialized, but unassigned portion of the SSD storage space 900 shown as 940 may be pressed into service to store data pages. Beyond this, the pool may be safely grown to the position identified by the pointer to the last used log page slot (925) by persisting updates to the pointers for the last reserved log page slot (935) and the last usable log page slot (945), effectively reassigning the portions of SSD storage space 900 shown as 930 and 940 to store data pages, rather than log pages. In some embodiments, the data page slot pool may be safely shrunk down to the position identified by the pointer to the first used data page slot (965) by initializing additional log page slots and persisting an update to the pointer to the last usable log page slot (945).

In embodiments that employ the allocation approach illustrated in FIG. 9, page sizes for the log page pool and the data page pool may be selected independently, while still facilitating good packing behavior. In such embodiments, there may be no possibility of a valid log page linking to a spoofed log page formed by application data, and it may be possible to distinguish between a corrupted log and a valid log tail that links to an as-yet-unwritten next page. In embodiments that employ the allocation approach illustrated in FIG. 9, at startup, all of the log page slots up to the position identified by the pointer to the last reserved log page slot (935) may be rapidly and sequentially read, and the entire log index may be reconstructed (including inferred linking/ordering). In such embodiments, there may be no need for explicit linking between log pages, since everything can be inferred from LSN sequencing constraints.

In some embodiments, a segment may consist of three main parts (or zones): one that contains a hot log, one that contains a cold log, and one that contains user page data. Zones are not necessarily contiguous regions of an SSD. Rather, they can be interspersed at the granularity of the storage page. In addition, there may be a root page for each segment that stores metadata about the segment and its properties. For example, the root page for a segment may store the user page size for the segment, the number of user pages in the segment, the current beginning/head of the hot log zone (which may be recorded in the form of a flush number), the volume epoch, and/or access control metadata.

In some embodiments, the hot log zone may accept new writes from the client as they are received by the storage node. Both Delta User Log Records (DULRs), which specify a change to a user page in the form of a delta from the previous version of the page, and Absolute User Log Records (AULRs), which specify the contents of a complete user page, may be written completely into the log. Log records may be added to this zone in approximately the order they are received (i.e. they are not sorted by LSN) and they can span across log pages. The log records may be self-describing, e.g., they may contain an indication of their own size. In some embodiments, no garbage collection is performed in this zone. Instead, space may be reclaimed by truncating from the beginning of the log after all required log records have been copied into the cold log. Log sectors in the hot zone may be annotated with the most recent known unconditional VDL each time a sector is written. Conditional VDL CLRs may be written into the hot zone as they are received, but only the most recently written VDL CLR may be meaningful.

In some embodiments, every time a new log page is written, it may be assigned a flush number. The flush number may be written as part of every sector within each log page. Flush numbers may be used to determine which log page was written later when comparing two log pages. Flush numbers are monotonically increasing and scoped to an SSD (or storage node). For example, a set of monotonically increasing flush numbers is shared between all segments on an SSD (or all segments on a storage node).

In some embodiments, in the cold log zone, log records may be stored in increasing order of their LSNs. In this zone, AULRs may not necessarily store data in-line, depending on their size. For example, if they have large payloads, all or a portion of the payloads may be stored in the data zone and they may point to where their data is stored in the data zone. In some embodiments, log pages in the cold log zone may be written one full page at a time, rather than sector-by-sector. Because log pages in the cold zone are written a full page at a time, any log page in the cold zone for which the flush numbers in all sectors are not identical may be considered to be an incompletely written page and may be ignored. In some embodiments, in the cold log zone, DULRs may be able to span across log pages (up to a maximum of two log pages). However, AULRs may not be able to span log sectors, e.g., so that a coalesce operation will be able to replace a DULR with an AULR in a single atomic write.

In some embodiments, the cold log zone is populated by copying log records from the hot log zone. In such embodiments, only log records whose LSN is less than or equal to the current unconditional volume durable LSN (VDL) may be eligible to be copied to the cold log zone. When moving log records from the hot log zone to the cold log zone, some log records (such as many CLRs) may not need to be copied because they are no longer necessary. In addition, some additional coalescing of user pages may be performed at this point, which may reduce the amount of copying required. In some embodiments, once a given hot zone log page has been completely written and is no longer the newest hot zone log page, and all ULRs on the hot zone log page have been successfully copied to the cold log zone, the hot zone log page may be freed and reused.

In some embodiments, garbage collection may be done in the cold log zone to reclaim space occupied by obsolete log records, e.g., log records that no longer need to be stored in the SSDs of the storage tier. For example, a log record may become obsolete when there is a subsequent AULR for the same user page and the version of the user page represented by the log record is not needed for retention on SSD. In some embodiments, a garbage collection process may reclaim space by merging two or more adjacent log pages and replacing them with fewer new log pages containing all of the non-obsolete log records from the log pages that they are replacing. The new log pages may be assigned new flush numbers that are larger than the flush numbers of the log pages they are replacing. After the write of these new log pages is complete, the replaced log pages may be added to the free page pool. Note that in some embodiments, there may not be any explicit chaining of log pages using any pointers. Instead, the sequence of log pages may be implicitly determined by the flush numbers on those pages. Whenever multiple copies of a log record are found, the log record present in the log page with highest flush number may be considered to be valid and the others may be considered to be obsolete.

In some embodiments, e.g., because the granularity of space managed within a data zone (sector) may be different from the granularity outside the data zone (storage page), there may be some fragmentation. In some embodiments, to keep this fragmentation under control, the system may keep track of the number of sectors used by each data page, may preferentially allocate from almost-full data pages, and may preferentially garbage collect almost-empty data pages (which may require moving data to a new location if it is still relevant). Note that pages allocated to a segment may in some embodiments be repurposed among the three zones. For example, when a page that was allocated to a segment is freed, it may remain associated with that segment for some period of time and may subsequently be used in any of the three zones of that segment. The sector header of every sector may indicate the zone to which the sector belongs. Once all sectors in a page are free, the page may be returned to a common free storage page pool that is shared across zones. This free storage page sharing may in some embodiments reduce (or avoid) fragmentation.

In some embodiments, the distributed database-optimized storage systems described herein may maintain various data structures in memory. For example, for each user page present in a segment, a user page table may store a bit indicating whether or not this user page is "cleared" (i.e., whether it includes all zeroes), the LSN of the latest log record from the cold log zone for the page, and an array/list of locations of all log records from the hot log zone for page. For each log record, the user page table may store the sector number, the offset of the log record within that sector, the number of sectors to read within that log page, the sector number of a second log page (if the log record spans log pages), and the number of sectors to read within that log page. In some embodiments, the user page table may also store the LSNs of every log record from the cold log zone and/or an array of sector numbers for the payload of the latest AULR if it is in the cold log zone.

In some embodiments of the distributed database-optimized storage systems described herein, an LSN index may be stored in memory. An LSN index may map LSNs to log pages within the cold log zone. Given that log records in cold log zone are sorted, it may be to include one entry per log page. However, in some embodiments, every non-obsolete LSN may be stored in the index and mapped to the corresponding sector numbers, offsets, and numbers of sectors for each log record.

In some embodiments of the distributed database-optimized storage systems described herein, a log page table may be stored in memory, and the log page table may be used during garbage collection of the cold log zone. For example, the log page table may identify which log records are obsolete (e.g., which log records can be garbage collected) and how much free space is available on each log page.

In the storage systems described herein, an extent may be a logical concept representing a highly durable unit of storage that can be combined with other extents (either concatenated or striped) to represent a volume. Each extent may be made durable by membership in a single protection group. An extent may provide an LSN-type read/write interface for a contiguous byte sub-range having a fixed size that is defined at creation. Read/write operations to an extent may be mapped into one or more appropriate segment read/write operations by the containing protection group. As used herein, the term "volume extent" may refer to an extent that is used to represent a specific sub-range of bytes within a volume.

As noted above, a volume may consist of multiple extents, each represented by a protection group consisting of one or more segments. In some embodiments, log records directed to different extents may have interleaved LSNs. For changes to the volume to be durable up to a particular LSN it may be necessary for all log records up to that LSN to be durable, regardless of the extent to which they belong. In some embodiments, the client may keep track of outstanding log records that have not yet been made durable, and once all ULRs up to a specific LSN are made durable, it may send a Volume Durable LSN (VDL) message to one of the protection groups in the volume. The VDL may be written to all synchronous mirror segments for the protection group. This is sometimes referred to as an "Unconditional VDL" and it may be periodically persisted to various segments (or more specifically, to various protection groups) along with write activity happening on the segments. In some embodiments, the Unconditional VDL may be stored in log sector headers.

In various embodiments, the operations that may be performed on a segment may include writing a DULR or AULR received from a client (which may involve writing the DULR or AULR to the tail of the hot log zone and then updating the user page table), reading a cold user page (which may involve locating the data sectors of the user page and returning them without needing to apply any additional DULRs), reading a hot user page (which may involve locating the data sectors of the most recent AULR for the user page and apply any subsequent DULRs to the user page before returning it), and replacing DULRs with AULRs (which may involve coalescing DULRs for a user page to create an AULR that replaces the last DULR that was applied). As described herein coalescing is the process of applying DULRs to an earlier version of a user page to create a later version of the user page. Coalescing a user page may help reduce read latency because (until another DULR is written) all DULRs written prior to coalescing may not need to be read and applied on demand. It may also help reclaim storage space by making old AULRs and DULRs obsolete (provided there is no snapshot requiring the log records to be present). In some embodiments, a coalescing operation may include locating a most recent AULR and applying any subsequent DULRs in sequence without skipping any of the DULRs. As noted above, in some embodiments, coalescing may not be performed within the hot log zone. Instead, it may be performed within the cold log zone. In some embodiments, coalescing may also be performed as log records are copied from the hot log zone to the cold log zone.

In some embodiments, the decision to coalesce a user page may be triggered by the size of the pending DULR chain for the page (e.g., if the length of the DULR chain exceeds a pre-defined threshold for a coalescing operation, according to a system-wide, application-specific or client-specified policy)), or by the user page being read by a client.

Figure 10:
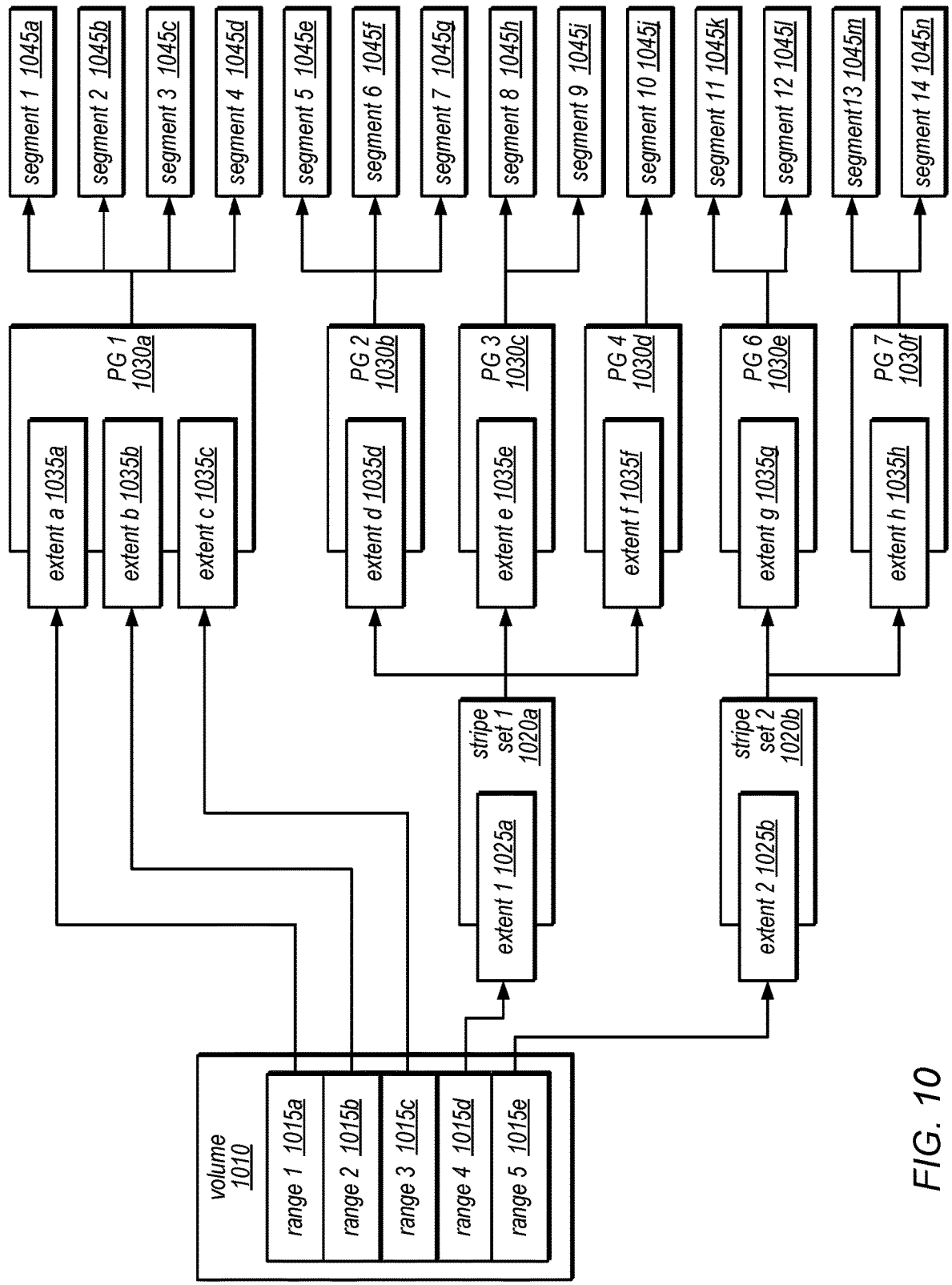
FIG. 10 is a block diagram illustrating an example configuration of a database volume, according to one embodiment.

FIG. 10 is a block diagram illustrating an example configuration of a database volume 1010, according to one embodiment. In this example, data corresponding to each of various address ranges 1015 (shown as address ranges 1015a-1015e) is stored as different segments 1045 (shown as segments 1045a-1045n). More specifically, data corresponding to each of various address ranges 1015 may be organized into different extents (shown as extents 1025a-1025b, and extents 1035a-1035h), and various ones of these extents may be included in different protection groups 1030 (shown as 1030a-1030f), with or without striping (such as that shown as stripe set 1020a and stripe set 1020b). In this example, protection group 1 illustrates the use of erasure coding. In this example, protection groups 2 and 3 and protection groups 6 and 7 represent mirrored data sets of each other, while protection group 4 represents a single-instance (non-redundant) data set. In this example, protection group 8 represents a multi-tier protection group that combines other protection groups (e.g., this may represent a multi-region protection group). In this example, stripe set 1 (1020a) and stripe set 2 (1020b) illustrates how extents (e.g., extents 1025a and 1025b) may be striped into a volume, in some embodiments.

More specifically, in this example, protection group 1 (1030a) includes extents a-c (1035a-1035c), which include data from ranges 1-3 (1015a-1015c), respectively, and these extents are mapped to segments 1-4 (1045a-1045d). Protection group 2 (1030b) includes extent d (1035d), which includes data striped from range 4 (1015d), and this extent is mapped to segments 5-7 (1045e-1045g). Similarly, protection group 3 (1030c) includes extent e (1035e), which includes data striped from range 4 (1015d), and is mapped to segments 8-9 (1045h-1045i); and protection group 4 (1030d) includes extent f (1035f), which includes data striped from range 4 (1015d), and is mapped to segment 10 (1045j). In this example, protection group 6 (1030e) includes extent g (1035g), which includes data striped from range 5 (1015e), and is mapped to segments 11-12 (1045k-1045l); and protection group 7 (1030f) includes extent h (1035h), which also includes data striped from range 5 (1015e), and is mapped to segments 13-14 (1045m-1045n).

Figure 11:
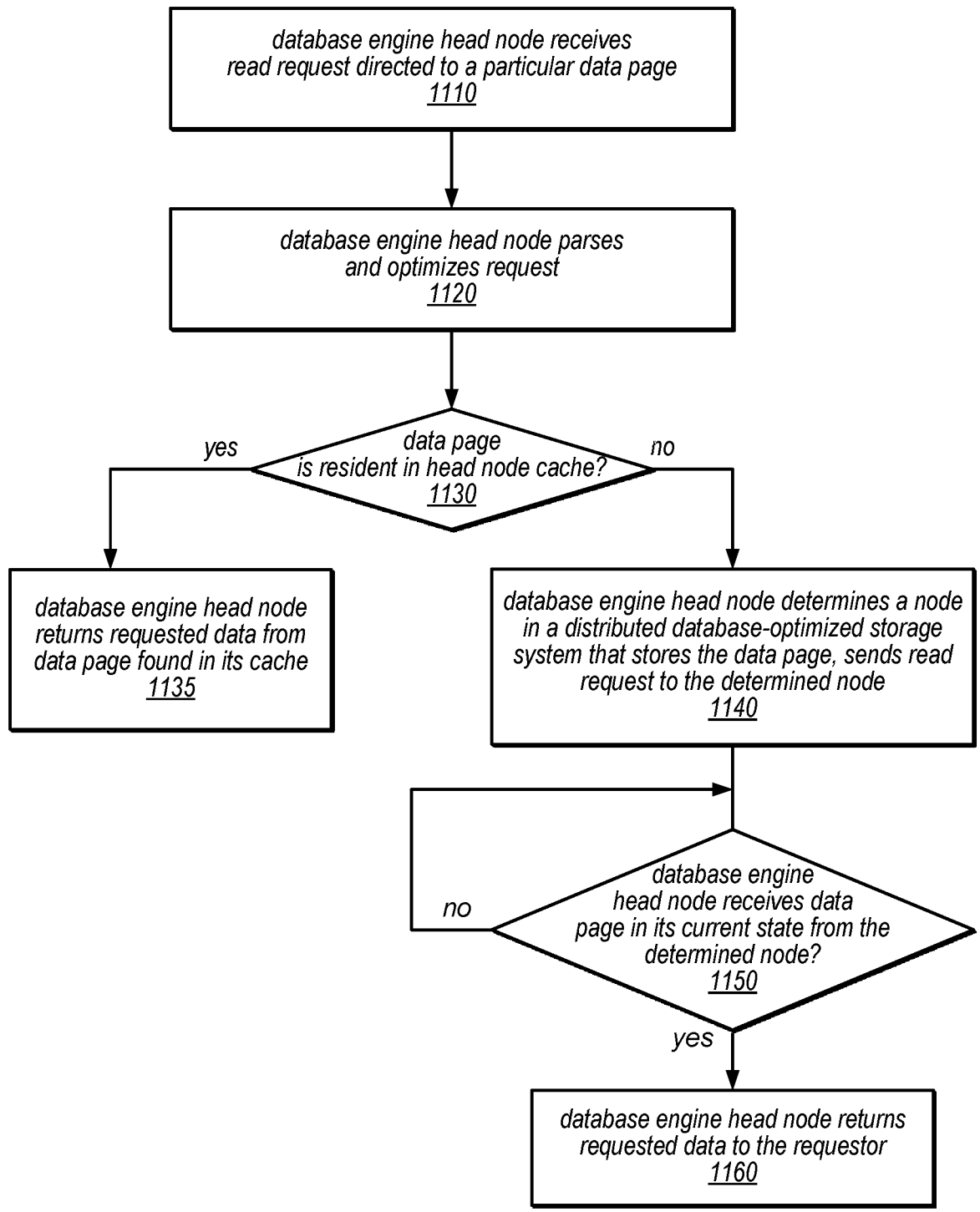
FIG. 11 is a flow diagram illustrating one embodiment of a method for performing a read operation in a database system, from the perspective of the database engine.

One embodiment of a method for performing a read operation in a database system, from the perspective of the database engine, is illustrated by the flow diagram in FIG. 11. As illustrated at 1110, in this example, the method may include the database engine head node receiving (e.g., from a database client), a read request directed to a particular data page. The method may also include the database engine head node (or a particular component thereof) parsing and/or optimizing the read request, as in 1120. For example, in some embodiments, the database engine head node may be responsible for generating a query execution plan. As illustrated in FIG. 11, if the particular data page is resident in the cache of the database engine head node, shown as the positive exit from 1130, the method may include the database engine head node returning the requested data from the version of the particular data page found in its cache, as in 1135. For example, in some embodiments, the database engine head node may temporality hold copies of the most recently accessed data pages in its cache, and may update those copies in response to receiving write requests directed to them (e.g., in addition to generating and passing redo log records for those write requests to a distributed database-optimized storage system). In some such embodiments, if a particular data page targeted by a read operation is resident in the cache, it may be assumed to be an up-to-date version of the particular data page (e.g., it may be assumed that all redo log records targeting the data page have already been applied to the version of the particular data page that is stored in the cache).

As illustrated in FIG. 11, if the particular data page is not resident in the cache of the database engine head node, shown as the negative exit from 1130, the method may include the database engine head node (or, more specifically, a client-side storage service driver on the database engine head node) determining a node in a distributed database-optimized storage system that stores the particular data page, and sending a corresponding read request to the determined storage system node, as in 1140. As illustrated in FIG. 11, there may be no other action taken by the database engine head node with respect to the read request until (and unless) the database engine head node (or, more specifically, the client-side storage service driver on the database engine head node) receives the particular data page (in its current state) from the storage system. Once the database engine head node (or, more specifically, the client-side storage service driver on the database engine head node) receives the particular data page in its current state from the determined storage system node (shown as the positive exit from 1150), the method may include the database engine head node returning the requested data to the requestor (e.g., the client from whom the read request was received), as in 1160. For example, if the version of the particular data page received from the determined storage system node is a version of the particular data page to which all redo log records targeting the particular data page to date have been applied (or at least all of the redo log records that could be applied while maintaining the transactionality and consistency properties of the database system), the database engine head node may return the requested data from the version of the particular data page received from the determined storage system node. Note that in some embodiments, if a current copy of the particular data page is not received from the storage system within a pre-determined time period, the database engine head node (or, more specifically, the client-side storage service driver on the database engine head node) may be configured to determine that the determined storage node has failed (or is degraded) or that some other error condition exists in the storage system. Note also that the operations illustrated in FIG. 11 for performing a read operation may be performed automatically (e.g., without user intervention) in the database system in response to receiving a read request.

Figure 12:
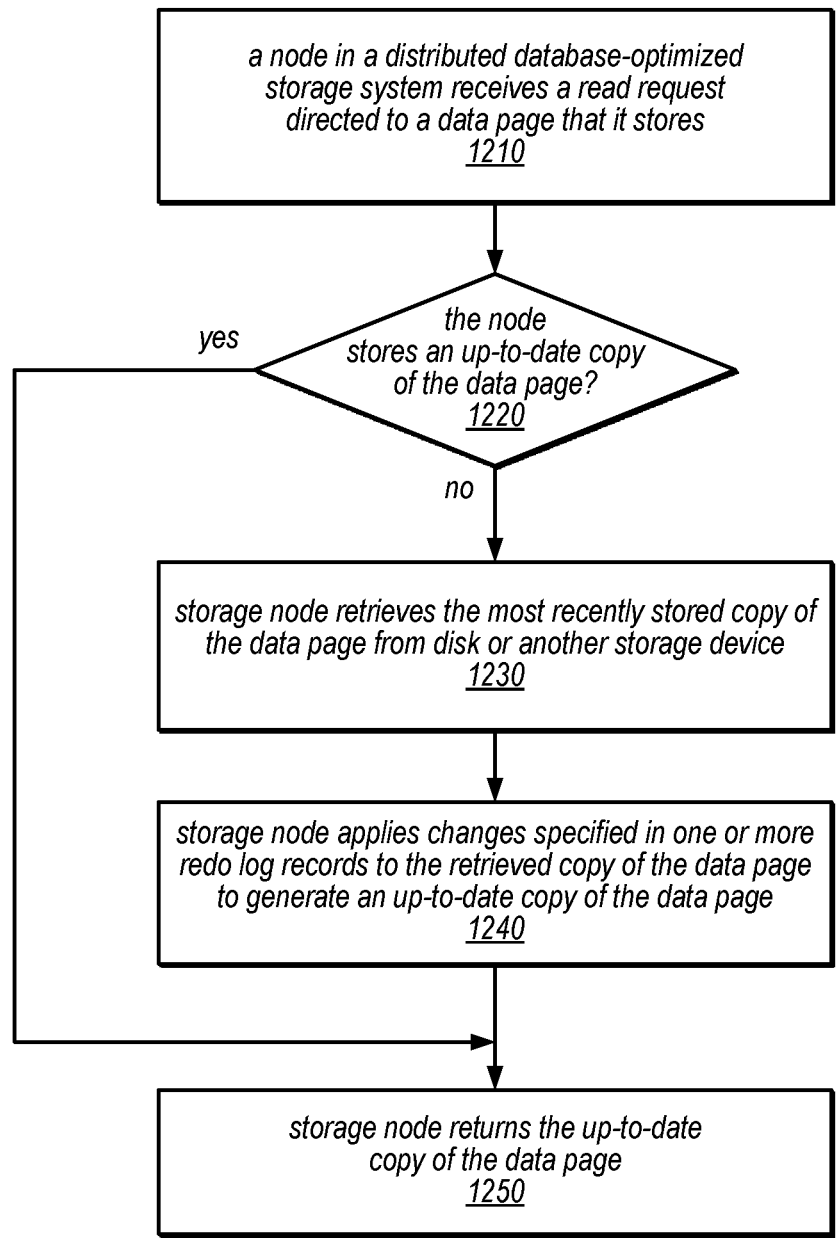
FIG. 12 is a flow diagram illustrating one embodiment of a method for performing a read operation in a database system, from the perspective of a distributed database-optimized storage system.

One embodiment of a method for performing a read operation in a database system, from the perspective of a distributed database-optimized storage system, is illustrated by the flow diagram in FIG. 12. As illustrated at 1210, in this example, the method may include a node in a distributed database-optimized storage system receiving a read request directed to a particular data page that is stored by the storage system node. In different embodiments, the storage system may receive the read request from a database engine (e.g., from a client-side storage service driver of a database head node), or from another storage service client. As illustrated in this example, if the storage system node stores an up-to-date copy of the data page (shown as the positive exit from 1220), the method may include the storage system node returning the up-to-date copy of the data page that it already stores, as in 1250. For example, if all of the redo log records targeting the particular block that have been received by the storage system node to date (or at least all of the redo log records that could be applied while maintaining the transactionality and consistency properties of the database system) have been applied to the particular data page (e.g., if they have been coalesced to create a current version of the particular data page), the storage system node may not need to perform an additional coalesce operation on the redo log records for the particular data page before returning a response.

On the other hand, if the storage system node does not store an up-to-date copy of the data page (shown as the negative exit from 1220), the method may include the storage system node retrieving the most recently stored copy of the particular data page from disk or from another persistent storage device, as in 1230, and then applying changes specified in one or more redo log records for the particular data page to the retrieved copy of the particular data page to generate an up-to-date copy of the particular data page, as in 1240. For example, the storage system node may apply to the retrieved copy of the particular data page any and all redo log records targeting the particular data page that have been received by the storage system node to date, but that have not yet been applied to the particular data page. Once the storage system node has created the up-to-date copy of the particular data page, the storage system node may return the newly created copy of the particular data page to the database engine (or other storage system client) as the up-to-date copy of the data page (as in 1250). Note that the operations illustrated in FIG. 12 for performing a read operation may be performed automatically (e.g., without user intervention) in the storage system in response to receiving a read request.

As previously noted, a protection group (PG) is an abstract distributed entity that represents a unit of durability formed by a collection of segments. In some embodiments, a protection group may represent one or more extents within a volume. A protection group may expose interfaces for one or more extents, and may encapsulate (and hide) one or more segments and associated metadata. The protection group may be responsible for maintaining durability of the extents that it exposes, according to durability policy configured for the protection group. In some embodiments, a protection group may achieve durability of all of its constituent extents by using redundant segments to persist extent data, and by actively maintaining such redundancy. The way in which the protection group maps extent read/write operations onto the underlying segments may be opaque to the users of the extents. Different redundancy strategies may be employed in different embodiments, including, but not limited to extent mirroring, extent erasure coding, and/or lazy replication.

A "mirrored protection group" is a protection group in which each of the constituent segments is a synchronous mirrored copy of a single extent. In this model, a change is considered durable if it has been made durable on all affected synchronous mirrored segments within the protection group. Protection groups may be formed within a single availability zone or across multiple availability zones. For example, for a protection group that encapsulates only segments within a particular availability zone, the availability of the protection group may be tied directly to availability of the associated availability zone. In some embodiments, a regional protection group may encapsulate segments across multiple availability zones. In some such embodiments, the regional protection group may be implemented as a collection of corresponding AZ Protection Groups, one from each AZ.

Figure 13:
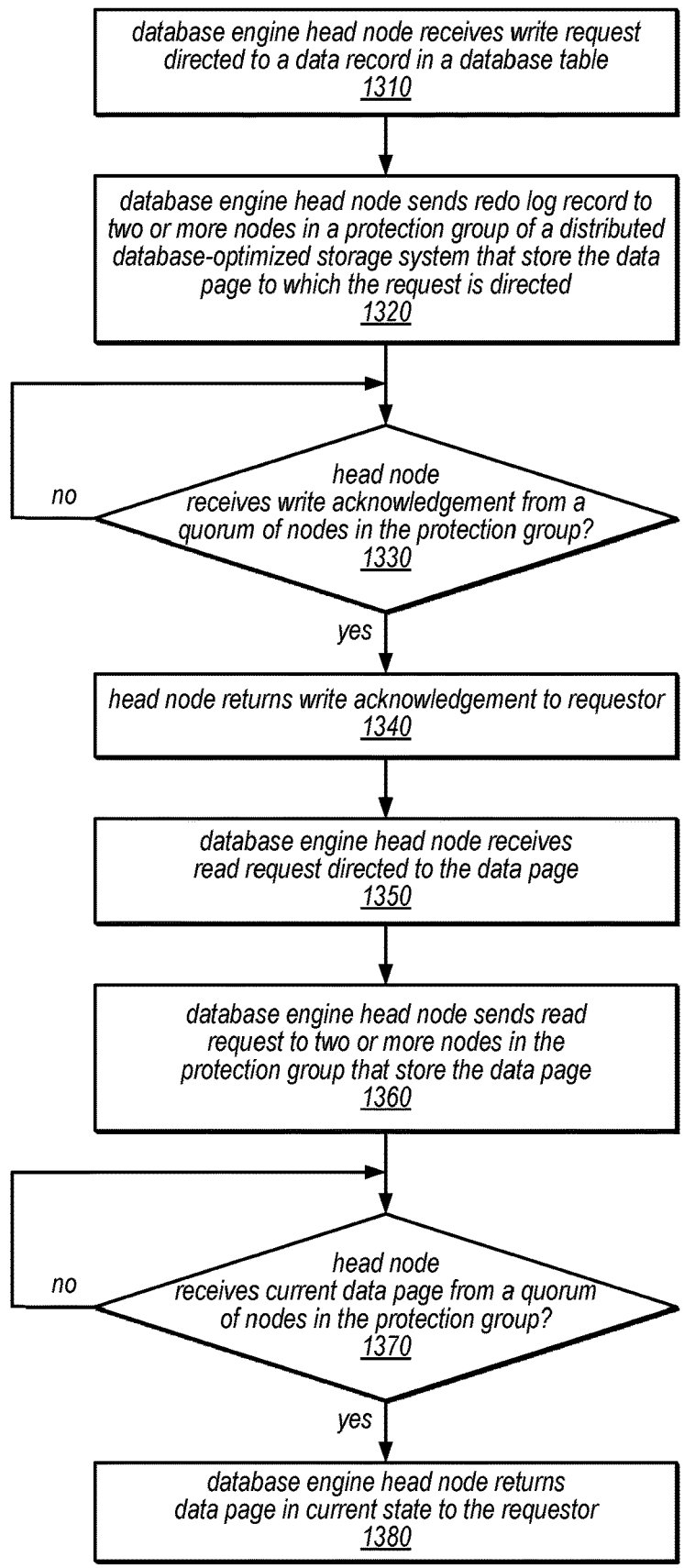
FIG. 13 is a flow diagram illustrating one embodiment of a method for performing read and write operations in a distributed database-optimized storage system that includes protection groups.

One embodiment of a method for performing read and write operations in a distributed database-optimized storage system that includes protection groups is illustrated by the flow diagram in FIG. 13. As illustrated at 1310, in this example, the method may include a database engine head node of a database tier receiving (e.g., from a database client) a write request directed to a data record in a database table. For example, the write request may specify that a new data record should be added to the database table (or to a particular data page thereof) or may specify a modification to an existing data record in a particular data page of the database table. In response to receiving the write request, the method may include the database engine head node (or, more specifically, a client-side storage service driver on the database engine head node) sending a redo log record (but not a copy of the particular data page to which the write request is directed) to two or more storage nodes in a protection group of a distributed database-optimized storage system that store the particular data page to which the request is directed, as in 1320.

As illustrated in this example, until the database engine head node (or, more specifically, the client-side storage service driver on the database engine head node) receives an acknowledgement that the write was successfully completed from a quorum of the storage nodes in the protection group, the database engine head node may wait to receive a write acknowledgement from a quorum of the storage nodes in the protection group. This is illustrated in FIG. 13 by the feedback from the negative exit from 1330 to the input to 1330. Once the database engine head node has received a write acknowledgement from a quorum of the storage nodes in the protection group (shown as the positive exit from 1330), the method may include the database engine head node returning a corresponding write acknowledgement to the requestor (e.g., to the database client), as in 1340. Note that in some embodiments, if a write acknowledgement is not received from a quorum of the storage nodes in the protection group within a pre-determined time period, the database engine head node (or, more specifically, the client-side storage service driver on the database engine head node) may be configured to determine that one or more of the storage nodes in the protection group have failed (or are degraded) or that some other error condition exists in the storage system.

As illustrated in FIG. 13, the method may include (e.g., at some point in time subsequent to receiving and responding to the write request), the database engine head node (or, more specifically, the client-side storage service driver on the database engine head node) receiving a read request directed to the particular data page (as in 1350). In response to receiving the read request, the method may include the database engine head node (or, more specifically, the client-side storage service driver on the database engine head node) sending a read request to two or more storage nodes in the protection group that store the particular data page (as in 1360).

As illustrated in this example, until the database engine head node (or, more specifically, the client-side storage service driver on the database engine head node) receives a current copy of the particular data page from a quorum of the storage nodes in the protection group, the database engine head node may wait to receive a current copy of the particular data page from a quorum of the storage nodes in the protection group. For example, in some embodiments, one or more of the storage nodes in the protection group may not store a current copy of the particular data page and may have to create a current copy of the particular data page by applying one or more pending redo log records to an earlier version of the particular data page (e.g., in a coalesce operation) before responding. This is illustrated in FIG. 13 by the feedback from the negative exit from 1370 to the input to 1370. Once the database engine head node has received a current copy of the particular data page from a quorum of the storage nodes in the protection group (shown as the positive exit from 1370), the method may include the database engine head node returning a current copy of the data page to the requestor (e.g., to the database client), as in 1380. Note that in some embodiments, if a current copy of the particular data page is not received from a quorum of the storage nodes in the protection group within a pre-determined time period, the database engine head node (or, more specifically, the client-side storage service driver on the database engine head node) may be configured to determine that one or more of the storage nodes in the protection group have failed (or are degraded) or that some other error condition exists in the storage system. Note also that the operations illustrated in FIG. 13 for performing write operations or for performing read operations may be performed automatically (e.g., without user intervention) in the database system in response to receiving requests to do so.

Some existing database systems flush all data pages to disk periodically (e.g., checkpointing all of the pages once every 5 minutes). In such systems, if there is a crash, the system might have to replay a large number of redo log records to re-create the current version of a data page to which a lot of changes were directed since the last time that data page was flushed. For example, this may be the case for a hot data page in the cache to which large numbers of changes are continuously directed, such as a page in which a sequence number is incremented each time an incoming order is received in an e-commerce application. Instead of checkpointing all data pages stored in the system at one time, in the systems described herein, checkpointing may be performed on a data block (e.g., data page) basis, rather than on a database or segment basis. For example, in some embodiments, checkpointing may be performed at each storage node, and each of the data pages stored on a particular storage node may be coalesced to create a new version of data page (e.g., a checkpoint of that data page) on the storage node only when it is warranted (e.g., when the number of redo log records its own redo log reaches a pre-determined number). In such embodiments, the database tier may not be involved in checkpointing at all. Instead, checkpointing may be a distributed process (e.g., a background process) that is the responsibility of the storage nodes themselves. Note that because checkpointing may be performed by a background process on the storage tier (which may have visibility into other foreground and/or background activities affecting each storage node), in some embodiments, the storage tier (or one of the storage system server nodes thereof) may be configured to postpone a checkpointing operation for a particular storage node if it is being heavily loaded by another foreground or background process. In some embodiments, postponing a checkpointing operation may prevent checkpointing from adversely affecting foreground latency.

In some embodiments, various in-memory data structures (such as those described herein) may be needed for a segment to function. In some embodiments, these in-memory structures may be built up during startup (e.g., following a crash) by doing a full scan of all log pages. In some embodiments, periodic checkpoints of some of these in-memory data structures may be performed to reduce startup time following a crash.

In some existing database systems, the database tier may need to write data pages out to the storage layer at the same frequency at which changes are being received, otherwise, if the cache gets full of dirtied pages that have not yet been written out to the storage layer, a page may have to be flushed in order to accept more changes, which introduces latency into the system. By contrast, in the systems described herein, as long as the redo logs for a data page in the cache of the database engine head node have been passed to the distributed storage system (and a write acknowledgement has been received), the database tier may evict the data page (which can be reconstructed by the storage layer at any time) from its cache.

In some embodiments of the systems described herein, crash recovery, flashback, and point in time restore operations may not require the replay of either redo or undo logs. Instead, they may include building an instance, resetting the current volume LSN to the appropriate commit point, and restarting the database service.

The database systems described herein may in some embodiments be scaled to accommodate larger database tables and/or higher throughput than some existing databases, without suffering some of the disadvantages associated with previous database scaling approaches (e.g., disadvantages in terms of complexity and/or cost). For example, in some embodiments, there may be no practical limit to the volume size, and volumes may be able to grow dynamically without loss of availability or change in performance (e.g., by adding an additional protection group of segments). In addition, assuming write traffic is spread across segments, IOPS may be made virtually unbounded. For example, in some embodiments, IOPS may be increased or decreased without impacting the performance of the currently running database, with any necessary restriping being performed in the background while new writes are forwarded to the storage tier. In such embodiments, query performance may be made predictable and consistent without the need to freeze IO traffic during backup operations or re-mirroring. Instead, the storage tier may manage striping, mirroring and heat management, removing these responsibilities from the database tier or administrator.

As described herein, all writes in the storage tier may be made durable on persistent media before being acknowledged back to the database tier. This may prevent logical corruptions on large-scale power events, and may remove the need to restore from backup, in such cases. In some embodiments, the only time a restore from backup is required may be in response to a customer error (e.g., the accidental deletion of a table, or similar).

In some embodiments, since replication operations involve moving log records, and not data blocks, the performance impact of replication may be much lower than in other database systems. In addition, coordination of writes across availability zones may be performed at the storage tier and may not require the use of a reserved database standby node for synchronous replication, which may reduce costs when compared with existing database systems.

The methods described herein may in various embodiments be implemented by any combination of hardware and software. For example, in one embodiment, the methods may be implemented by a computer system that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

Figure 14:
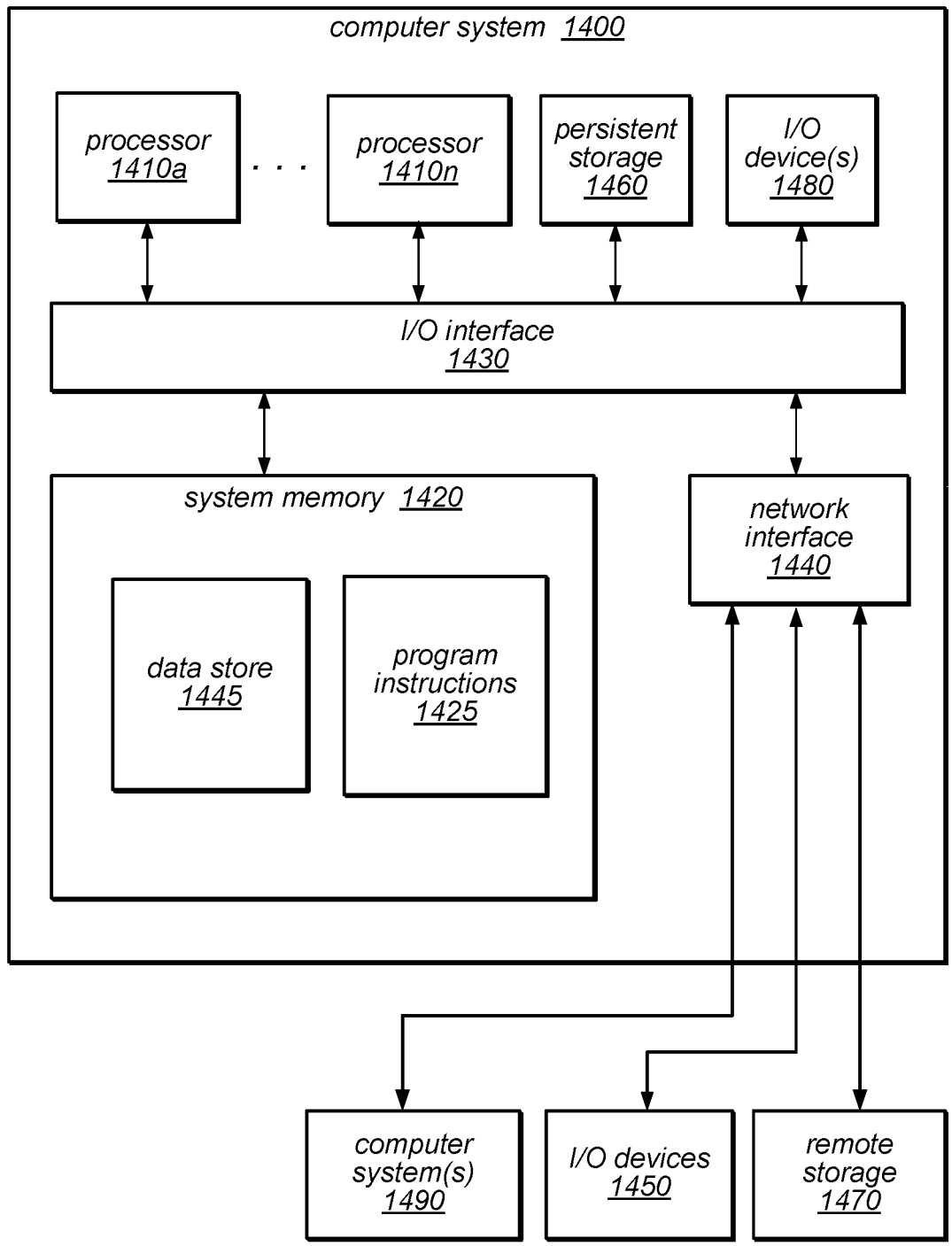
FIG. 14 is a block diagram illustrating a computer system configured to implement at least a portion of a database system that includes a database engine and a separate distributed database storage service, according to various embodiments.

FIG. 14 is a block diagram illustrating a computer system configured to implement at least a portion of the database systems described herein, according to various embodiments. For example, computer system 1400 may be configured to implement a database engine head node of a database tier, or one of a plurality of storage nodes of a separate distributed database-optimized storage system that stores database tables and associated metadata on behalf of clients of the database tier, in different embodiments. Computer system 1400 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1400 includes one or more processors 1410 (any of which may include multiple cores, which may be single or multi-threaded) coupled to a system memory 1420 via an input/output (I/O) interface 1430. Computer system 1400 further includes a network interface 1440 coupled to I/O interface 1430. In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA. The computer system 1400 also includes one or more network communication devices (e.g., network interface 1440) for communicating with other systems and/or components over a communications network (e.g. Internet, LAN, etc.). For example, a client application executing on system 1400 may use network interface 1440 to communicate with a server application executing on a single server or on a cluster of servers that implement one or more of the components of the database systems described herein. In another example, an instance of a server application executing on computer system 1400 may use network interface 1440 to communicate with other instances of the server application (or another server application) that may be implemented on other computer systems (e.g., computer systems 1490).

In the illustrated embodiment, computer system 1400 also includes one or more persistent storage devices 1460 and/or one or more I/O devices 1480. In various embodiments, persistent storage devices 1460 may correspond to disk drives, tape drives, solid state memory, other mass storage devices, or any other persistent storage device. Computer system 1400 (or a distributed application or operating system operating thereon) may store instructions and/or data in persistent storage devices 1460, as desired, and may retrieve the stored instruction and/or data as needed. For example, in some embodiments, computer system 1400 may host a storage system server node, and persistent storage 1460 may include the SSDs attached to that server node.

Computer system 1400 includes one or more system memories 1420 that are configured to store instructions and data accessible by processor(s) 1410. In various embodiments, system memories 1420 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1420 may contain program instructions 1425 that are executable by processor(s) 1410 to implement the methods and techniques described herein. In various embodiments, program instructions 1425 may be encoded in platform native binary, any interpreted language such as Java™ byte-code, or in any other language such as C/C++, Java™, etc., or in any combination thereof. For example, in the illustrated embodiment, program instructions 1425 include program instructions executable to implement the functionality of a database engine head node of a database tier, or one of a plurality of storage nodes of a separate distributed database-optimized storage system that stores database tables and associated metadata on behalf of clients of the database tier, in different embodiments. In some embodiments, program instructions 1425 may implement multiple separate clients, server nodes, and/or other components.

In some embodiments, program instructions 1425 may include instructions executable to implement an operating system (not shown), which may be any of various operating systems, such as UNIX, LINUX, Solaris™, MacOS™, Windows™, etc. Any or all of program instructions 1425 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1400 via I/O interface 1430. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1400 as system memory 1420 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1440.

In some embodiments, system memory 1420 may include data store 1445, which may be configured as described herein. For example, the information described herein as being stored by the database tier (e.g., on a database engine head node), such as a transaction log, an undo log, cached page data, or other information used in performing the functions of the database tiers described herein may be stored in data store 1445 or in another portion of system memory 1420 on one or more nodes, in persistent storage 1460, and/or on one or more remote storage devices 1470, at different times and in various embodiments. Similarly, the information described herein as being stored by the storage tier (e.g., redo log records, coalesced data pages, and/or other information used in performing the functions of the distributed storage systems described herein) may be stored in data store 1445 or in another portion of system memory 1420 on one or more nodes, in persistent storage 1460, and/or on one or more remote storage devices 1470, at different times and in various embodiments. In general, system memory 1420 (e.g., data store 1445 within system memory 1420), persistent storage 1460, and/or remote storage 1470 may store data blocks, replicas of data blocks, metadata associated with data blocks and/or their state, database configuration information, and/or any other information usable in implementing the methods and techniques described herein.

In one embodiment, I/O interface 1430 may be configured to coordinate I/O traffic between processor 1410, system memory 1420 and any peripheral devices in the system, including through network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments, some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems 1490 (which may implement one or more storage system server nodes, database engine head nodes, and/or clients of the database systems described herein), for example. In addition, network interface 1440 may be configured to allow communication between computer system 1400 and various I/O devices 1450 and/or remote storage 1470. Input/output devices 1450 may, in some embodiments, include one or more display terminals, keyboards, keypads, touchpads, scanning devices, voice or optical recognition devices, or any other devices suitable for entering or retrieving data by one or more computer systems 1400. Multiple input/output devices 1450 may be present in computer system 1400 or may be distributed on various nodes of a distributed system that includes computer system 1400. In some embodiments, similar input/output devices may be separate from computer system 1400 and may interact with one or more nodes of a distributed system that includes computer system 1400 through a wired or wireless connection, such as over network interface 1440. Network interface 1440 may commonly support one or more wireless networking protocols (e.g., Wi-Fi/IEEE 802.11, or another wireless networking standard). However, in various embodiments, network interface 1440 may support communication via any suitable wired or wireless general data networks, such as other types of Ethernet networks, for example. Additionally, network interface 1440 may support communication via telecommunications/telephony networks such as analog voice networks or digital fiber communications networks, via storage area networks such as Fibre Channel SANs, or via any other suitable type of network and/or protocol. In various embodiments, computer system 1400 may include more, fewer, or different components than those illustrated in FIG. 14 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:
one or more computing nodes, each of which comprises at least one processor and a memory, wherein the one or more computing nodes are configured to collectively implement a distributed storage service that stores data blocks on one or more storage devices on behalf of a client of the distributed storage service;
wherein a given one of the one or more computing nodes is configured to:
receive, from the client, an update record targeting a particular data block that is stored on the given computing node, wherein the targeted data block is a contiguous block of memory of the given compute node, and wherein the update record specifies a modification to be made to the particular data block;
write the update record to one or more of the one or more storage devices; and
return, to the client, an acknowledgement that the update record targeting the particular data block was written, wherein the acknowledgment is returned by the given computing node to the client before generation, at the given computing node, of a current version of the particular data block based at least on the modification of the particular data block specified by the update record targeting the particular data block.

2. The system of claim 1, wherein, subsequent to returning the acknowledgement, the given one of the one or more computing nodes is further configured to:
write the current version of the particular data block to one or more of the one or more storage devices.

3. The system of claim 2, wherein to generate the current version of the particular data block, the given computing node is configured to apply the update record to a previously stored version of the particular data block.

4. The system of claim 3, wherein to generate the current version of the particular data block, the given computing node is further configured to apply, to the previously stored version of the particular data block, one or more other update records representing modifications to the particular data block that were received since the previously stored version of the particular data block was written.

5. The system of claim 2 wherein to generate the current version of the particular data block, the given computing node is configured to execute a background process to apply the update record and one or more other update records to a previously stored version of the particular data block while a foreground process receives read or write requests targeting data blocks stored by the distributed storage service.

6. The system of claim 2,
wherein the given one of the one or more computing nodes is further configured to receive, from the client, a read request targeting the data block; and
wherein generating the current version of the particular data block is performed in response to receiving the read request.

7. The system of claim 1,
wherein another one of the one or more computing nodes stores the particular data block; and
wherein the other one of the one or more computing nodes is configured to:
receive, from the client, the update record for the particular data block;
write the update record to another one of the one or more storage devices;
return, to the client, another acknowledgement that the update record was written; and
subsequent to returning the other acknowledgement:
generate a current version of the particular data block, wherein to generate the current version of the particular data block, the given computing node is configured to apply the update record to a previously stored version of the particular data block; and
write the current version of the particular data block to another one of the one or more storage devices.

8. The system of claim 1, further including a database engine head node, the database engine head node configured to:
receive, from a client of the distributed storage service, a write request directed to a given data record in a database table, wherein the write request specifies a modification to be made to the given data record;
generate a redo log record representing the modification to be made to the given data record;
send the redo log record, but not a data page comprising the given data record, to a particular server node of the distributed storage service that stores a version of the data page comprising the given data record.

9. A method, comprising:
receiving, from a client of a distributed storage service, an update record targeting a particular data block that is stored on a given computing node of the distributed storage service, wherein the targeted data block is a contiguous block of memory of the given compute node, and wherein the update record specifies a modification to be made to the particular block, wherein the receiving occurs at the given computing node which comprises at least one processor and a memory, wherein the distributed storage service stores data blocks on one or more storage devices on behalf of the client;
writing, by the given computing node, the update record to one or more of the one or more storage devices; and
returning to the client, by the given computing node, an acknowledgement that the update record targeting the particular data block was written, wherein the acknowledgment is returned by the given computing node to the client before generation, at the given computing node, of a current version of the particular data block based at least on the modification of the particular data block specified in the update record targeting the particular data block.

10. The method of claim 9, wherein another computing node of the distributed storage service stores the particular data block; and
the method further comprising the other computing node:
receiving, from the client, the update record for the particular data block;
writing the update record to another one of the one or more storage devices;
returning, to the client, another acknowledgement that the update record was written; and
subsequent to returning the other acknowledgement:
generating a current version of the particular data block, wherein said generating comprises applying the update record to a previously stored version of the particular data block; and
writing the current version of the particular data block to another one of the one or more storage devices.

11. The method of claim 9, further comprising, subsequent to returning the acknowledgement:
writing, by the given computing node, the current version of the particular data block to one or more of the one or more storage devices.

12. The method of claim 11, wherein said generating the current version of the particular data block comprises applying the update record to a previously stored version of the particular data block.

13. The method of claim 12, wherein said generating the current version of the particular data block comprises applying, to the previously stored version of the particular data block, one or more other update records representing modifications to the particular data block that were received since the previously stored version of the particular data block was written.

14. The method of claim 11, wherein said generating the current version of the particular data block comprises executing a background process to apply the update record and one or more other update records to a previously stored version of the particular data block while a foreground process receives read or write requests targeting data blocks stored by the distributed storage service.

15. The method of claim 11, further comprising:
receiving, by the given computing node from the client, a read request targeting the data block; and
generating, by the given computing node, the current version of the particular data block in response to receiving the read request.

16. A non-transitory computer-readable storage medium storing program instructions that when executed on a computer cause the computer to perform:
receiving, from a client of a distributed storage service, an update record targeting a particular data block that is stored on a given computing node of the distributed storage service, wherein the targeted data block is a contiguous block of memory of the given compute node, and wherein the update record specifies a modification to be made to the particular block, wherein the receiving occurs at the given computing node which comprises at least one processor and a memory, wherein the distributed storage service stores data blocks on one or more storage devices on behalf of the client;
writing, by the given computing node, the update record to one or more of the one or more storage devices; and
returning to the client, by the given computing node, an acknowledgement that the update record targeting the particular data block was written, wherein the acknowledgment is returned by the given computing node to the client before generation, at the given computing node, of a current version of the particular data block based at least on the modification of the particular data block specified in the update record targeting the particular data block.

17. The non-transitory computer-readable storage medium of claim 16, wherein the program instructions when executed the computer further cause the computer to perform:

write the current version of the particular data block to one or more of the one or more storage devices.

18. The non-transitory computer-readable storage medium of claim 17, wherein to generate the current version of the particular data block, the program instructions when executed the computer further cause the computer to apply the update record to a previously stored version of the particular data block.

19. The non-transitory computer-readable storage medium of claim 18, wherein to generate the current version of the particular data block, the program instructions when executed the computer further cause the computer to apply, to the previously stored version of the particular data block, one or more other update records representing modifications to the particular data block that were received since the previously stored version of the particular data block was written.

20. The non-transitory computer-readable storage medium of claim 17, wherein to generate the current version of the particular data block, the program instructions when executed the computer further cause the computer to execute a background process to apply the update record and one or more other update records to a previously stored version of the particular data block while a foreground process receives read or write requests targeting data blocks stored by the distributed storage service.

* * * * *